US012250527B2

(12) United States Patent
Wang et al.

(10) Patent No.: US 12,250,527 B2
(45) Date of Patent: Mar. 11, 2025

(54) COMMUNICATION TERMINAL, COMMUNICATION SYSTEM AND AUDIO INFORMATION PROCESSING METHOD

(71) Applicant: LUXSHARE-ICT CO., LTD., Taipei (TW)

(72) Inventors: Hui-Yu Wang, Taipei (TW); Chi-Liang Chen, Taipei (TW); You-Yu Lin, Taipei (TW); Min-Hsuan Lee, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 316 days.

(21) Appl. No.: 17/872,265

(22) Filed: Jul. 25, 2022

(65) Prior Publication Data

US 2023/0029845 A1 Feb. 2, 2023

(30) Foreign Application Priority Data

Jul. 28, 2021 (CN) ......................... 202110857904.6

(51) Int. Cl.
*H04R 3/00* (2006.01)
*H04R 1/08* (2006.01)
(Continued)

(52) U.S. Cl.
CPC ................. *H04R 3/02* (2013.01); *H04R 1/08* (2013.01); *H04R 27/00* (2013.01); *H04R 2420/07* (2013.01)

(58) Field of Classification Search
CPC ..... H04R 2420/07; H04R 3/005; H04R 27/00
(Continued)

(56) References Cited

U.S. PATENT DOCUMENTS 10,433,084 B2 * 10/2019 Anderson ............. G10L 19/008
10,771,387 B1 * 9/2020 Bosshart ................. H04L 69/22
(Continued)

FOREIGN PATENT DOCUMENTS

CN 106937009 A 7/2017
CN 207410510 U 5/2018
(Continued)

*Primary Examiner* — Disler Paul
(74) *Attorney, Agent, or Firm* — Birch, Stewart, Kolasch & Birch, LLP

(57) ABSTRACT

Disclosed in embodiments of the present disclosure are a communication terminal, a communication system and an audio information processing method, the communication terminal includes a sound reception assembly and a basic communication module, wherein the basic communication module of the communication terminal receives second pickup audio information in a wireless manner, such that the communication terminal acquires returned audio information according to first pickup audio information generated by the communication terminal and the received second pickup audio information, and transmits outwards the returned audio information. Therefore, the technical solution in the embodiments of the present disclosure may realize synchronous sound reception of a plurality of wireless sound reception apparatuses or wireless sound reception components, and may satisfy a requirement for multiple people to use, thereby achieving a good sound reception effect.

13 Claims, 24 Drawing Sheets

(51) Int. Cl.
*H04R 3/02* (2006.01)
*H04R 27/00* (2006.01)

(58) Field of Classification Search
USPC .......................................................... 381/77, 92
See application file for complete search history.

(56) References Cited

U.S. PATENT DOCUMENTS

| | | | | |
|---|---|---|---|---|
| 11,564,049 | B2 * | 1/2023 | Tossing | H04R 27/00 |
| 2019/0108838 | A1 | 4/2019 | LaBosco | |
| 2020/0251121 | A1 | 8/2020 | Kobayashi | |

FOREIGN PATENT DOCUMENTS

| | | | |
|---|---|---|---|
| CN | 112055122 | A | 12/2020 |
| CN | 112735455 | A | 4/2021 |
| CN | 112995838 | A | 6/2021 |
| JP | 2009-206671 | A | 9/2009 |
| TW | 201626817 | A | 7/2016 |
| TW | I699120 | B | 7/2020 |

* cited by examiner

COMMUNICATION TERMINAL, COMMUNICATION SYSTEM AND AUDIO INFORMATION PROCESSING METHOD

CLAIM OF PRIORITY AND CROSS-REFERENCE TO RELATED APPLICATION(S)

This application claims the benefit of Chinese Patent Application No. 202110857904.6, filed on Jul. 28, 2021, entitled "Communication terminal, communication system and audio information processing method", which is incorporated herein by reference in its entirety.

BACKGROUND OF THE INVENTION

1. Field of the Invention

The present disclosure relates to the technical field of information processing, and more particularly to a communication terminal, communication system and audio information processing method.

2. Description of the Related Art

Conference is a common communication activity for mutual communication, interchange or problem solving. In a conference, a communication terminal or a communication system is often used for communication. In an existing wireless communication system, when multiple wireless sound reception apparatuses or wireless sound reception component is used to receive sound, generally only one wireless sound reception apparatus or wireless sound reception component is selected to receive sound, but the multiple wireless sound reception apparatuses or wireless sound reception components cannot be used simultaneously to receive sound. Therefore, the existing wireless communication system cannot achieve a good sound reception effect when multiple people speak at the same time.

BRIEF DESCRIPTION OF THE INVENTION

In view of the existing status, an embodiment of the present disclosure provides a communication terminal, communication system and audio information processing method, capable of realizing synchronous sound reception in use by multiple people.

In a first aspect, an embodiment of the present disclosure provides a communication terminal, the communication terminal including a sound reception assembly and a basic communication module, wherein the sound reception assembly includes a first sound reception unit; the first sound reception unit is configured to pick up sound to generate first pickup audio information; the basic communication module is configured to receive second pickup audio information in a wireless manner and transmit outwards returned audio information; the returned audio information is acquired according to the first pickup audio information and the second pickup audio information.

In some embodiments, the first sound reception unit includes a first acousto-electric conversion device and a first audio processing module; the first acousto-electric conversion device is configured to pick up sound to generate a first audio signal; the first audio processing module is configured to generate the first pickup audio information according to the first audio signal.

In some embodiments, the basic communication module is further configured to transmit the second pickup audio information to the first audio processing module; the first audio processing module is further configured to perform an audio mixing process on the first pickup audio information and the second pickup audio information to acquire the returned audio information.

In some embodiments, the first sound reception unit further includes a first wireless communication module; the first wireless communication module is electrically connected to the first audio processing module, and is configured to transmit the first pickup audio information to the basic communication module.

In some embodiments, the communication terminal further includes a third audio processing module; the third audio processing module is electrically connected to the basic communication module, and is configured to perform an audio mixing process on the first pickup audio information and the second pickup audio information to acquire the returned audio information.

In some embodiments, the basic communication module is further configured to receive stand-by audio information; the communication terminal further includes a loudspeaker assembly for playing the stand-by audio information; the basic communication module is further configured to transmit the stand-by audio information to the first sound reception unit; the first audio processing module is further configured to perform an echo cancellation process on the first audio signal according to the stand-by audio information to generate the first pickup audio information.

In some embodiments, the sound reception assembly further includes at least one second sound reception unit; the second sound reception unit includes a second acousto-electric conversion device, a second audio processing module, and a second wireless communication module; the second acousto-electric conversion device is configured to pick up sound to generate a second audio signal; the second audio processing module is configured to generate the second pickup audio information according to the second audio signal; and the second wireless communication module is configured to transmit the second pickup audio information to the basic communication module.

In some embodiments, the basic communication module is further configured to receive stand-by audio information; the communication terminal further includes a loudspeaker assembly for playing the stand-by audio information; the basic communication module is further configured to transmit the stand-by audio information to the second sound reception unit; the second audio processing module is further configured to perform an echo cancellation process on the second audio signal according to the stand-by audio information to generate the second pickup audio information.

In some embodiments, the basic communication module is further configured to receive stand-by audio information; the communication terminal further includes a loudspeaker assembly for playing the stand-by audio information; the basic communication module is further configured to broadcast the stand-by audio information in a wireless manner; and the first sound reception unit is further configured to receive the broadcast stand-by audio information in a wireless manner.

In a second aspect, an embodiment of the present disclosure further provides another communication terminal, including a sound reception assembly and a basic communication module, wherein the sound reception assembly is configured to pick up sound to generate first pickup audio information; the basic communication module is configured to transmit returned audio information to other communication terminals paired with the basic communication module in a wireless manner; and the returned audio information is acquired according to the first pickup audio information.

In a third aspect, an embodiment of the present disclosure further provides a communication system, the communication system including a primary communication terminal and at least one secondary communication terminal; the primary communication terminal includes a primary basic communication module and a primary sound reception assembly; the primary sound reception assembly is configured to pick up sound to generate primary pickup audio information; the secondary communication terminal includes a secondary basic communication module and a secondary sound reception assembly; the secondary sound reception assembly is configured to pick up sound to generate secondary pickup audio information; the secondary basic communication module is configured to transmit secondary returned audio information to the primary basic communication module in a wireless manner; and the secondary returned audio information is acquired according to the secondary pickup audio information, wherein the primary basic communication module is configured to transmit outwards primary returned audio information, the primary returned audio information being acquired according to the primary pickup audio information and the secondary pickup audio information.

In some embodiments, the primary basic communication module is further configured to receive stand-by audio information; the primary sound reception assembly includes a primary acousto-electric conversion device and a primary audio processing module; the primary acousto-electric conversion device is configured to pick up sound to generate a primary audio signal; the primary audio processing module is configured to perform an echo cancellation process on the primary audio signal according to the stand-by audio information, so as to generate the primary pickup audio information; the secondary sound reception assembly includes a secondary acousto-electric conversion device and a secondary audio processing module; the secondary acousto-electric conversion device is configured to pick up sound to generate a secondary audio signal; the secondary audio processing module is configured to perform an echo cancellation process on the secondary audio signal according to the stand-by audio information, so as to generate the secondary pickup audio information.

In a fourth aspect, an embodiment of the present disclosure further provides an audio information processing method, applied to a communication terminal, the method including the following steps: generating first pickup audio information by a first sound reception unit; acquiring second pickup audio information by a basic communication module in a wireless manner; acquiring returned audio information according to the first pickup audio information and the second pickup audio information; and transmitting outwards the returned audio information by the basic communication module.

In some embodiments, the acquiring returned audio information according to the first pickup audio information and the second pickup audio information includes: performing an audio mixing process on the first pickup audio information and the second pickup audio information to acquire the returned audio information; the performing an audio mixing process on the first pickup audio information and the second pickup audio information to acquire the returned audio information includes: performing, by a first sound reception unit, an audio mixing process on the first pickup audio information and the second pickup audio information to acquire the returned audio information; or performing, by a third audio processing module, an audio mixing process on the first pickup audio information and the second pickup audio information to acquire the returned audio information, wherein the third audio processing module is electrically connected to the basic communication module.

In some embodiments, the method further includes the following steps: acquiring stand-by audio information from the external by the basic communication module; playing the stand-by audio information by a loudspeaker assembly; broadcasting the stand-by audio information by the basic communication module in a wireless manner; picking up sound to generate a second audio signal by a second sound reception unit; and performing an echo cancellation process on the second audio signal according to the stand-by audio information to acquire the second pickup audio information; the generating first pickup audio information by a first sound reception unit includes: picking up sound to generate a first audio signal by a first sound reception unit; and performing an echo cancellation process on the first audio signal according to the stand-by audio information to acquire the first pickup audio information.

Disclosed in embodiments of the present disclosure are a communication terminal, a communication system and an audio information processing method, the communication terminal includes a sound reception assembly and a basic communication module, wherein the basic communication module of the communication terminal receives second pickup audio information in a wireless manner, such that the communication terminal acquires returned audio information according to first pickup audio information generated by the communication terminal and the received second pickup audio information, and transmits outwards the returned audio information. Therefore, the technical solution in the embodiments of the present disclosure may realize synchronous sound reception of a plurality of wireless sound reception apparatuses or wireless sound reception components, and may satisfy a requirement for multiple people to use, thereby achieving a good sound reception effect.

BRIEF DESCRIPTION OF THE DRAWINGS

Through the following description of the embodiments of the present disclosure with reference to the drawings, the above and other objectives, features and advantages of the present disclosure will become more apparent, wherein.

DETAILED DESCRIPTION OF EMBODIMENTS OF THE INVENTION

The present disclosure is described below on the basis of the embodiments, but is not merely limited to these embodiments. Specific details are described in detail in the following detailed description of the present disclosure. The present disclosure can also be fully understood by a person skilled in the art without the description of the details. In order to avoid confusing the essence of the present disclosure, commonly known method, process, flow, element and circuit are not described in detail.

In addition, a person skilled in the art should understand that the drawings herein are provided for the purpose of description only, and are not necessarily drawn in proportion.

Unless otherwise stated, the terms “comprise”, “include” and the like in the specification shall be interpreted as inclusive rather than exclusive or exhaustive; in other words, the terms mean “include but not limited to”.

In the descriptions of the present disclosure, it should be understood that the terms like “first”, “second” and the like are used for the purpose of description only, but cannot be considered to indicate or imply relative importance. In addition, in the descriptions of the present disclosure, unless otherwise stated, the meaning of “a plurality of” is two or more.

Figure 1:
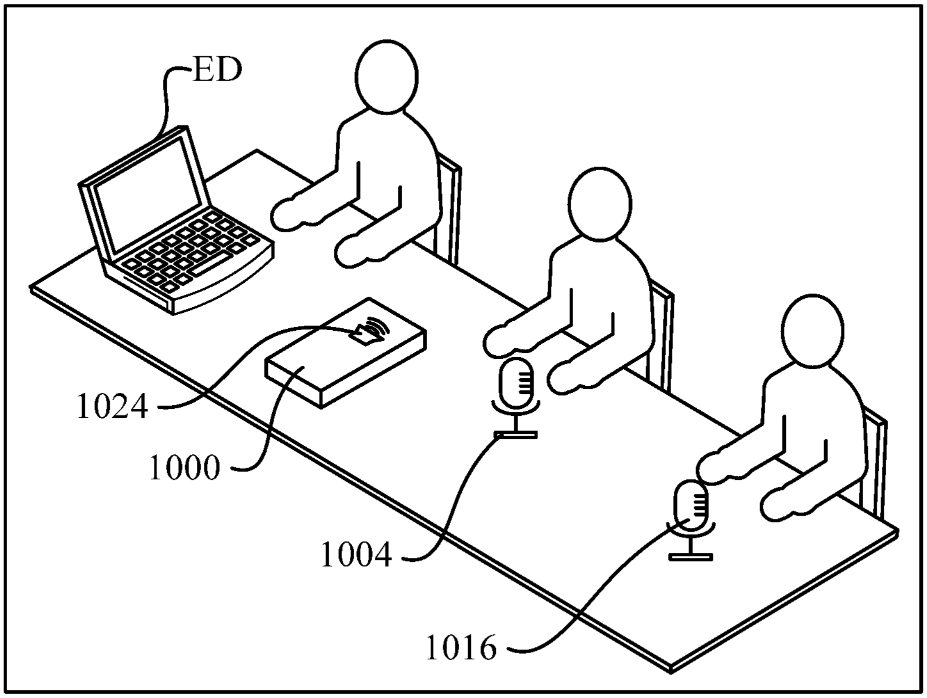
FIG. 1 is a schematic view of a use scenario of the communication terminal according to embodiments of the present disclosure.
Figure 2:
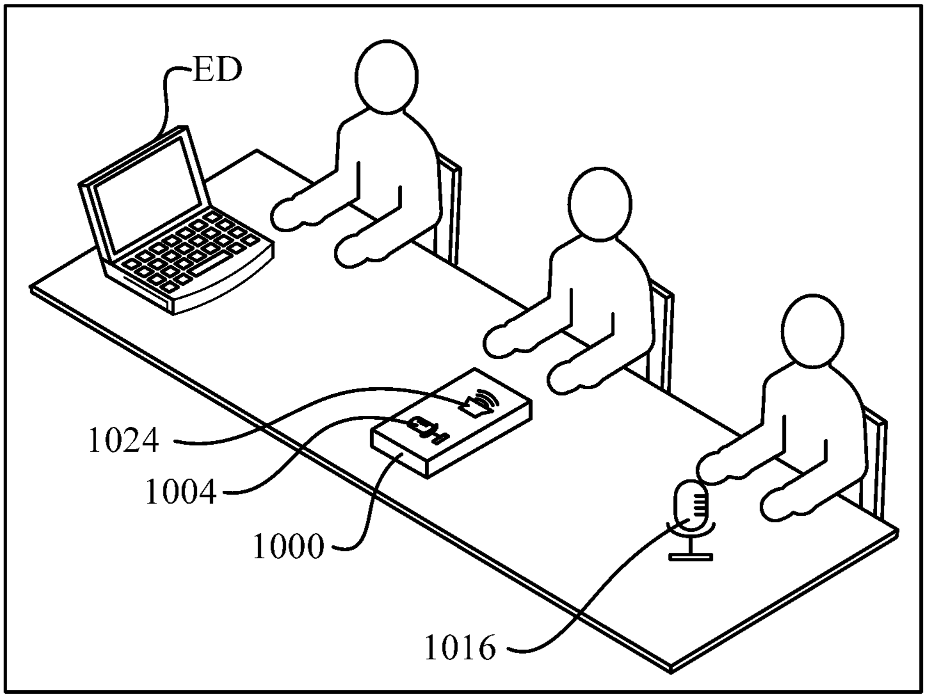
FIG. 2 is a schematic view of another use scenario of the communication terminal according to embodiments of the present disclosure.
Figure 3:
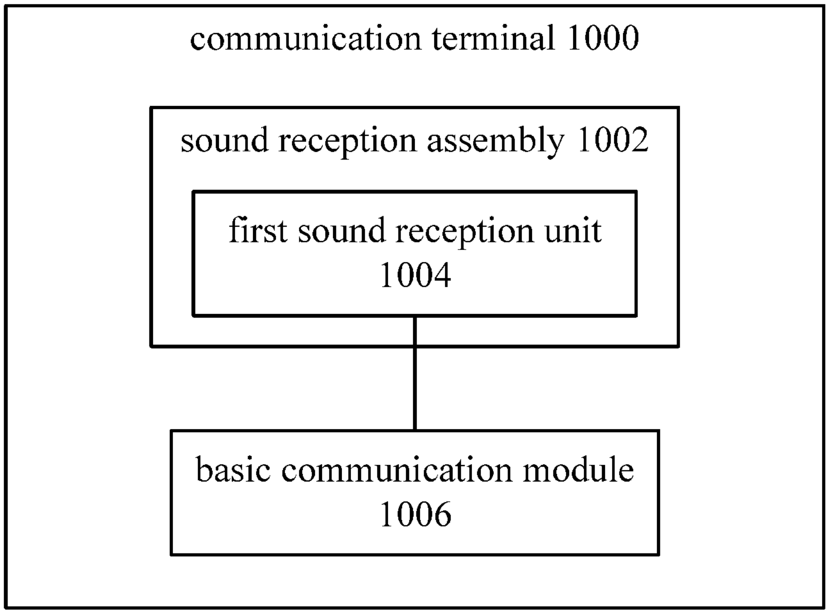
FIG. 3 is a structural block diagram of the first embodiment of the communication terminal according to embodiments of the present disclosure.

FIG. 1 and FIG. 2 are schematic views of two use scenarios of the communication terminal according to embodiments of the present disclosure. FIG. 3 is a structural block diagram of the first embodiment of the communication terminal according to embodiments of the present disclosure.

With reference to FIG. 1-3, the communication terminal 1000 includes a sound reception assembly 1002 and a basic communication module 1006. The sound reception assembly 1002 includes a first sound reception unit 1004 configured to pick up sound to generate first pickup audio information. The basic communication module 1006 is used to receive second pickup audio information in a wireless manner. The communication terminal 1000 acquires returned audio information according to the first pickup audio information and the second pickup audio information. The basic communication module 1006 may establish an electrical connection and/or a communication connection with an external device in addition to the communication terminal 1000 in a wired and/or wireless manner, and transmits the returned audio information to the external device ED.

In the present disclosure, the external device ED is a device which may receive/transmit signals from/to the basic communication module 1006 of the communication terminal 1000 in a wired and/or wireless manner. The external device may be various devices which may receive the returned audio information and store and/or process the returned audio information, such as a computer, a tablet computer, a mobile phone, a server, other communication terminals and the like. The basic communication module 1006 transmits the returned audio information to the external device ED, such that the external device ED may store, process, transmit, or perform other operations on the returned audio information.

In one use scenario, with reference to FIG. 1-2, the external device ED may be a computer; the computer may communicate with apparatuses at other geographic positions by means of one or more wired or wireless networks (for example, the Internet). The computer may transmit the returned audio information to the apparatuses at other geographic positions by means of the wired or wireless network, or may also receive information from the apparatuses at other geographic positions. For example, the external device ED at place A may communicate information with a device at place B by the Internet, and may transmit audio, video, text, picture or other information, such that people at different geographic positions may hold a remote conference.

In the present disclosure, the basic communication module 1006 may communicate in a wireless manner. The wireless communication mode of the basic communication module 1006 may include one or more of Bluetooth communication, WIFI communication, infrared communication, radio frequency communication, and other wireless communication modes. In one embodiment, the basic communication module 1006 includes a variety of wireless communication modes; the basic communication module 1006 may switch in the variety of wireless communication modes according to the communication modes supported by device establishing the communication connection (for example, other communication terminals), so as to ensure the generality of the communication terminal 1000. In some embodiments, the basic communication module 1006 may also communicate in a wired manner. In one embodiment, the communication terminal 1000 further includes one or more hardware interfaces; and the basic communication module 1006 may be connected to other components on the communication terminal or the external device ED having corresponding interface by the hardware interface, so as to transmit information. The hardware interface may include one or more of USB interface, HDMI interface, optical fiber interface, digital coaxial interface, and other hardware interfaces capable of transmitting audio information.

The basic communication module 1006 may establish a wireless communication connection with other devices in addition to the communication terminal 1000 and/or other parts on the communication terminal 1000 in a wireless manner, and may receive the second pickup audio information from other devices in addition to the communication terminal 1000 and/or other parts on the communication terminal 1000. After the basic communication module 1006 receives the second pickup audio information, the communication terminal 1000 follows a preset rule or the input of a user to acquire corresponding returned audio information according to the first pickup audio information and the second pickup audio information; and the basic communication module 1006 transmits the returned audio information to the external device ED. Compared with the mode that an apparatus generating the second pickup audio information directly transmits the second pickup audio information to the external device in a wireless manner, the mode that the communication terminal 1000 receives the second pickup audio information and then generates and transmits the returned audio information to the external device ED may reduce the amount of the information received by the external device ED, so as to avoid the situation that the external device ED may only receive the audio information transmitted by a few wireless sound reception apparatuses due to the bandwidth limitation of the wireless network. Furthermore, the communication terminal 1000 may process multiple audio information from different sources, so as to reduce the processing calculation amount of the external device ED or other computing apparatuses connected to the external device ED in the process of processing the audio information.

In the present disclosure, the first sound reception unit 1004 may be any apparatus which may pick up sound and output a signal capable of reflecting the picked sound and readable for the basic communication module. The first sound reception unit 1004 may establish a communication with the basic communication module 1006 in a wired and/or wireless manner, so as to receive/transmit information from/to the basic communication module 1006. In the structural block diagrams shown in the present disclosure, a connecting line between components is only used to represent that the components connected by the connecting line have a signal transmission relationship therebetween, but does not mean that the components connected by the connecting line necessarily have a physical or electrical connection relationship therebetween; and the signal transmission relationship may be realized in a wired manner, or may also be realized in a wireless manner. For example, in FIG. 3, the connecting line between the first sound reception unit 1004 and the basic communication module 1006 is used to show that the first sound reception unit 1004 and the basic communication module 1006 have a signal transmission relationship therebetween, but does not mean that the first sound reception unit 1004 and the basic communication module 1006 necessarily have a physical or electrical connection relationship; and the first sound reception unit 1004 and the basic communication module 1006 may transmit signals to each other in a wired or wireless manner.

The first sound reception unit 1004 may be integrated with the main part of the communication terminal 1000, or may also be separated from the main part of the communication terminal 1000. In one embodiment, with reference to FIG. 2, the basic communication module 1006 and the first sound reception unit 1004 are both disposed in the main part of the communication terminal 1000; and the basic communication module 1006 is electrically connected to the first sound reception unit 1004. In another embodiment, with reference to FIG. 1, the basic communication module 1006 is disposed in the main part of the communication terminal 1000; the first sound reception unit 1004 is separated from the main part of the communication terminal 1000, for example, the first sound reception unit 1004 may be a wireless microphone (with reference to FIG. 1), or is disposed in a wireless microphone, such that the first sound reception unit may be separated from the main part of the communication terminal 1000. In one application scenario, the communication terminal 1000 may be a wireless headphone; the wireless headphone is provided with one or more microphones; the one or more microphones are used as sound reception assembly 1002 of the communication terminal 1000, wherein at least one microphone is used as the first sound reception unit 1004. In one embodiment, the one or more microphones may be detachably connected to the main part of the wireless headphone; that is, the microphone may be combined with or separated from the main part of the wireless headphone. When the wireless headphone is used, the microphone may be combined with the main part of the wireless headphone, or may also be detached from the main part of the wireless headphone, thereby facilitating the user to use.

Figure 4:
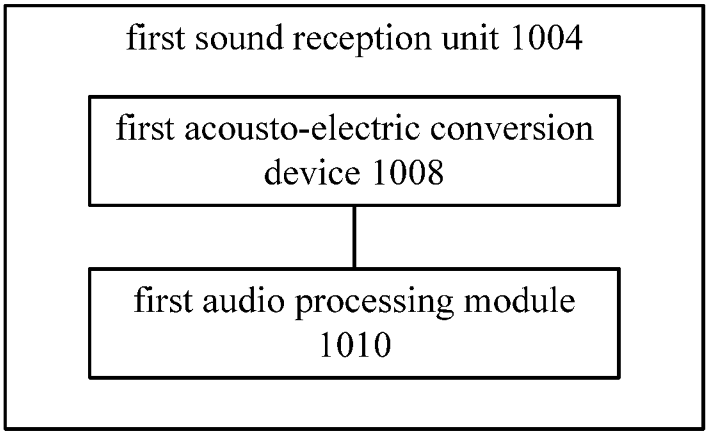
FIG. 4 is a structural block diagram of the first embodiment of the first sound reception unit according to embodiments of the present disclosure.
Figure 5:
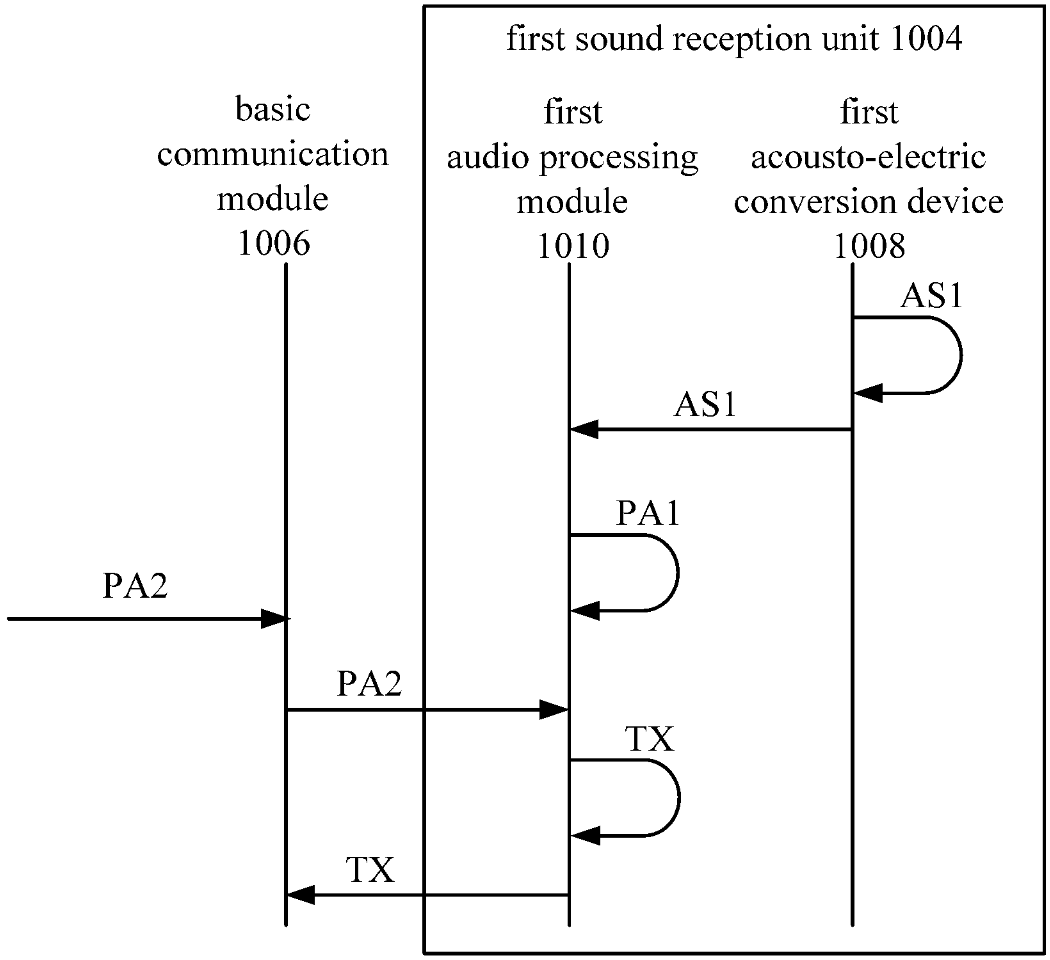
FIG. 5 is a schematic view of an information flow direction when the first sound reception unit operates according to embodiments of the present disclosure.

FIG. 4 is a structural block diagram of a first sound reception unit according to embodiments of the present disclosure. FIG. 5 is a schematic view of information flow direction when the first sound reception unit operates according to embodiments of the present disclosure.

With reference to FIG. 4-5, in some embodiments, the first sound reception unit 1004 includes a first acousto-electric conversion device 1008 and a first audio processing module 1010, wherein the first audio processing module 1010 is electrically connected to the first acousto-electric conversion device 1008. The first acousto-electric conversion device 1008 may pick up sound, and convert a picked acoustic signal into an electrical signal to generate a first audio signal AS1. The first acousto-electric conversion device 1008 may include one or more of piezoelectric microphone, electromagnetic microphone, electret microphone, and other forms of acousto-electric conversion devices. The first acousto-electric conversion device 1008 transmits the first audio signal AS1 to the first audio processing module 1010; and the first audio processing module 1010 generate corresponding first pickup audio information PA1 according to the first audio signal AS1. The first audio processing module 1010 may be connected to the basic communication module 1006 in a wired manner, so as to realize signal transmission with the basic communication module 1006.

In the present disclosure, each information flow direction view only shows one possible information flow direction; in practical use, the occurrence order of the information flow direction does not necessarily occur according to the arrangement order from top to bottom as shown in the flow direction view. For example, in FIG. 5, the arrow denoting the generation of the first pickup audio information PA1 is located above the arrow denoting the transmission of the second pickup audio information PA2 from the basic communication module 1006 to the first audio processing module 1010, but the generation time of the first pickup audio information PA1 is not necessarily earlier than the time when the second pickup audio information PA2 arrives at the first audio processing module 1010 from the basic communication module 1006; the generation of the first pickup audio information PA1 and the arrival of the second pickup audio information PA2 from the basic communication module 1006 to the first audio processing module 1010 may occur at the same time, or the generation time of the first pickup audio information PA1 is later than the time when the second pickup audio information PA2 arrives at the first audio processing module 1010 from the basic communication module 1006. Furthermore, in order to show the operating principle of the communication terminal conveniently, the information flow direction view does not list all the components of the communication terminal.

With reference to FIG. 3-5, in some embodiments, the basic communication module 1006 is further configured to transmit the received second pickup audio information PA2 to the first audio processing module 1010 of the first sound reception unit 1004. The first audio processing module 1010 is further configured to perform an audio mixing process on the first pickup audio information PA1 and the second pickup audio information PA2 according to the preset rule or the input of the user, and acquire the corresponding returned audio information TX according to an audio mixing result. The first audio processing module 1010 further transmits the returned audio information TX to the basic communication module 1006.

In the present disclosure, audio mixing refers to that audios from multiple sources are integrated into a stereo audio track or a mono audio track. During audio mixing, the audio processing module may adjust the frequency, tone quality and position of each pickup audio information, so as to optimize the audio track. For example, the position of each pickup audio information may be adjusted according to the differences in the time delay of the transmission of the pickup audio information from different sources. For another example, the pickup audio information with a low volume in a plurality of pickup audio information, it's volume may be increased. The returned audio information may achieve a better sound effect by performing an audio mixing operation on the first pickup audio information and the second pickup audio information.

Certainly, as required, the communication terminal may not perform an audio mixing process on the first pickup audio information and the second pickup audio information.

Figure 6:
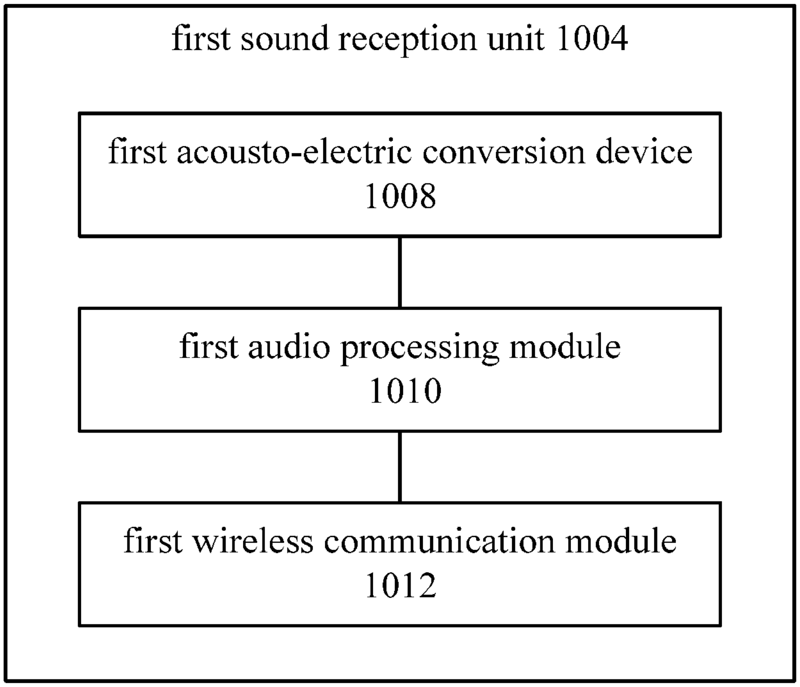
FIG. 6 is a structural block diagram of the second embodiment of the first sound reception unit according to embodiments of the present disclosure.

FIG. 6 is a structural block diagram of another first sound reception unit according to embodiments of the present disclosure.

With reference to FIG. 6, in some embodiments, the first sound reception unit 1004 communicates with the basic communication module 1006 in a wireless manner. In a feasible embodiment, the first sound reception unit 1004 may include a first acousto-electric conversion device 1008, a first audio processing module 1010, and a wireless communication module 1012; the first wireless communication module 1012 is electrically connected to the first audio processing module 1010, and may transmit the first pickup audio information to the basic communication module 1006 in a wireless manner. The wireless communication mode of the first wireless communication module 1012 may include one or more of Bluetooth communication, WIFI communication, infrared communication, radio frequency communication, and other wireless communication modes. The first wireless communication module 1012 and the basic communication module 1006 have at least one same wireless communication mode, such that the first wireless communication module 1012 may establish a wireless communication connection with the basic communication module 1006. In a feasible embodiment, the first wireless communication module 1012 may realize the communication connection in a short distance wireless transmission mode (for example, Bluetooth).

Figure 7:
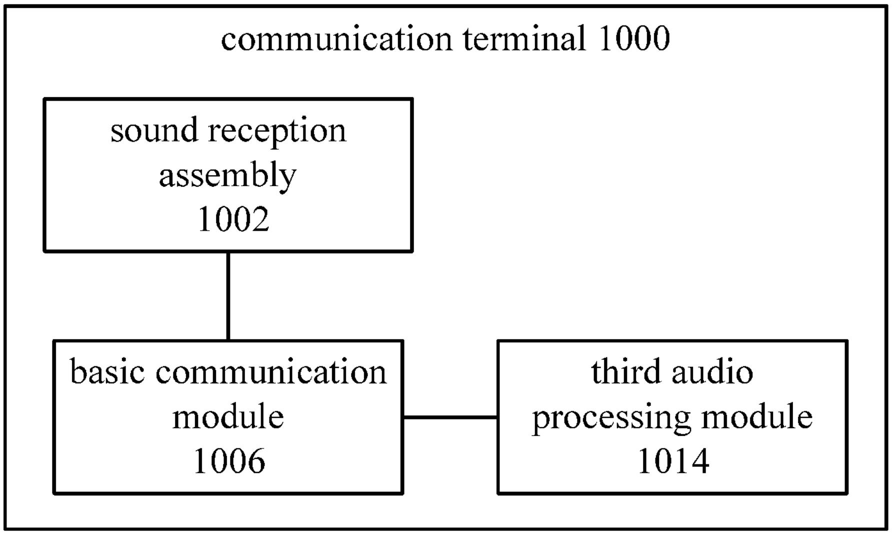
FIG. 7 is a structural block diagram of the second embodiment of the communication terminal according to embodiments of the present disclosure.
Figure 8:
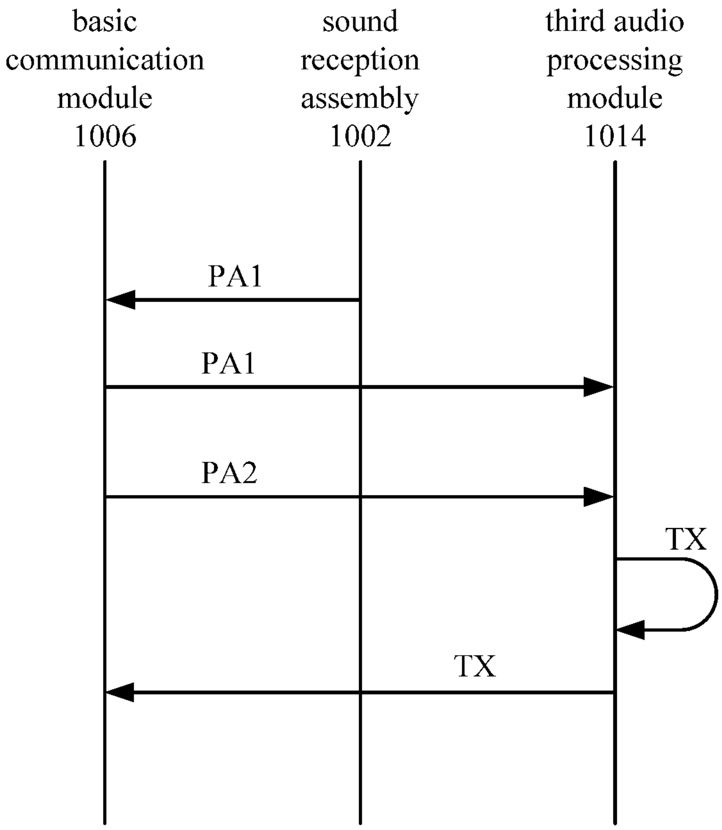
FIG. 8 is a schematic view of information flow direction when the third audio processing module operates according to embodiments of the present disclosure.

FIG. 7 is a structural block diagram of the second embodiment of the communication terminal according to embodiments of the present disclosure. FIG. 8 is a schematic view of information flow direction when the third audio processing module operates according to embodiments of the present disclosure.

With reference to FIG. 7, in some embodiments, the communication terminal 1000 further includes a third audio processing module 1014, wherein the third audio processing module 1014 is electrically connected to the basic communication module 1006. FIG. 8 schematically shows the information flow direction when the third audio processing module 1014 of the second embodiment of the communication terminal in embodiments of the present disclosure as shown in FIG. 7 operates. With reference to FIG. 7-8, in some embodiments, the first sound reception unit of the sound reception assembly 1002 communicates with the basic communication module 1006 in a wireless manner, and transmits the first pickup audio information PA1 to the basic communication module 1006. The first sound reception unit may be separated from the main part of the communication terminal 1000. In one embodiment, the basic communication module 1006 is disposed in the main part of the communication terminal 1000; the first sound reception unit is separated from the main part of the communication terminal 1000, for example, the first sound reception unit may be a wireless microphone, or is disposed in a wireless microphone. The basic communication module 1006 transmits the received first pickup audio information PA1 and the second pickup audio information PA2 to the third audio processing module 1014; and the third audio processing module 1014 is configured to perform an audio mixing process on the first pickup audio information PA1 and the second pickup audio information PA2 according to the preset rule or the input of the user, and acquire the corresponding returned audio information TX according to an audio mixing result. The third audio processing module 1014 is further configured to transmit the returned audio information TX to the basic communication module.

Figure 9:
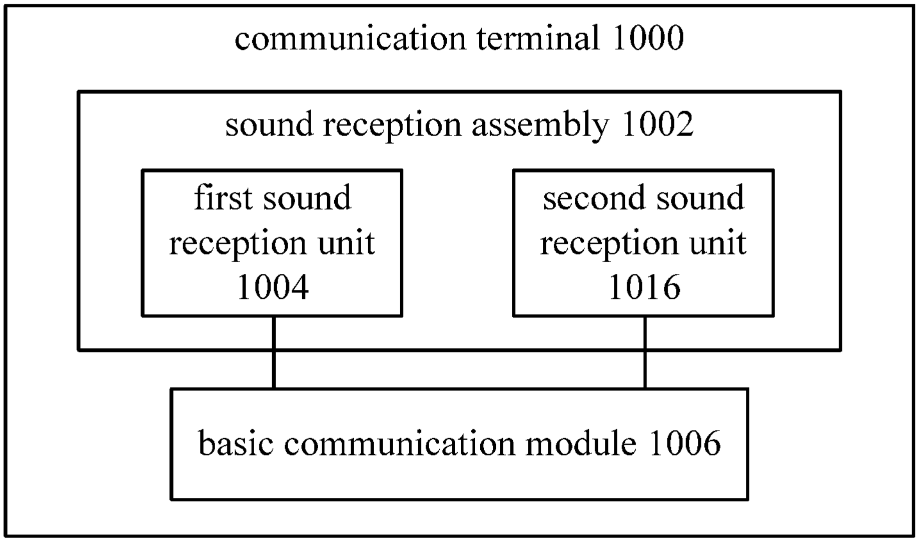
FIG. 9 is a structural block diagram of the third embodiment of the communication terminal according to embodiments of the present disclosure.

FIG. 9 is a structural block diagram of the third communication terminal according to embodiments of the present disclosure.

With reference to FIG. 9, in some embodiments, the sound reception assembly 1002 further includes a second sound reception unit 1016. The second sound reception unit 1016 is configured to pick up sound to generate second pickup audio information, and transmit the second pickup audio information to the basic communication module 1006 in a wireless manner. Similar to the first sound reception unit 1004, the second sound reception unit 1016 may be any apparatus which may pick up sound and output a signal capable of reflecting the picked sound and readable for the basic communication module 1006. For example, the second sound reception unit 1016 may be a wireless microphone (with reference to FIG. 1-2), or is disposed in a wireless microphone. In one embodiment, with reference to FIG. 1-2, the second sound reception unit 1016 may be separated from the main part of the communication terminal 1000, thereby improving the flexibility of the communication terminal when it's receiving sound. When multiple people attend a conference, different people may respectively use the first sound reception unit 1004 and the second sound reception unit 1016 to receive sound.

In one application scenario, the communication terminal 1000 may be a wireless headphone as described above; the wireless headphone is provided with a plurality of microphones, wherein at least one microphone is used as the first sound reception unit 1004, and at least one microphone is used as the second sound reception unit 1016. For example, the wireless headphone includes two microphones, wherein one microphone is used as the first sound reception unit 1004, and the other is used as the second sound reception unit 1016. The microphone as the second sound reception unit 1016 is detachably connected to the main part of the wireless headphone. When the wireless headphone is used, the microphone as the second sound reception unit 1016 may be combined with the main part of the wireless headphone, and the second sound reception unit 1016 may also be detached from the main part of the wireless headphone, thereby facilitating the user to use. The microphone as the first sound reception unit 1004 may be integrated in the main part of the wireless headphone, may be detachably connected to the main part of the wireless headphone, or may also be separated from the main part of the wireless headphone.

Figure 10:
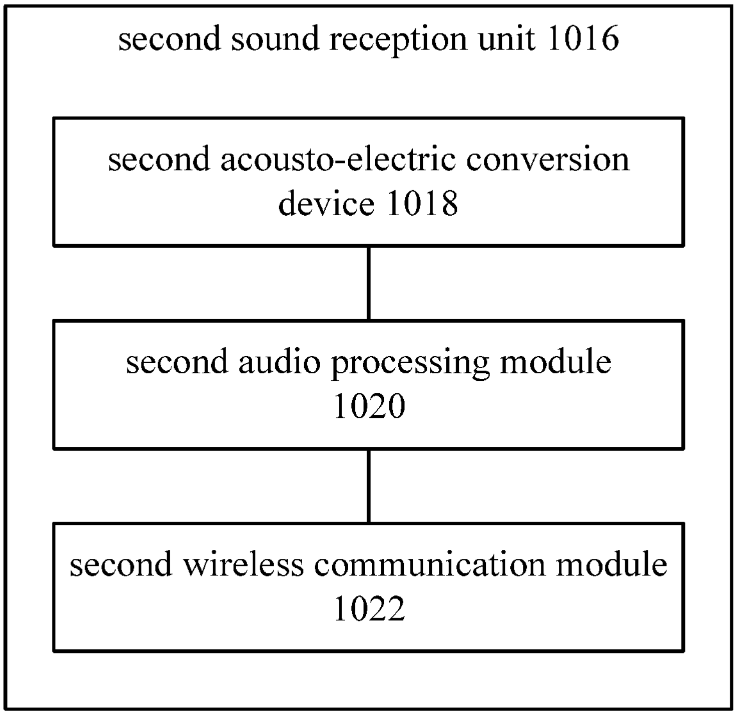
FIG. 10 is a structural block diagram of the second sound reception unit according to embodiments of the present disclosure.

FIG. 10 is a structural block diagram of the second sound reception unit according to embodiments of the present disclosure.

With reference to FIG. 10, in some embodiments, the second sound reception unit 1016 includes a second acousto-electric conversion device 1018, a second audio processing module 1020, and a second wireless communication module 1022. The second acousto-electric conversion device 1018 picks up sound, and converts the picked acoustic signal into an electrical signal to generate a second audio signal. The second acousto-electric conversion device 1018 may include one or more of piezoelectric microphone, electromagnetic microphone, an electret microphone, and other forms of acousto-electric conversion devices. The second audio processing module 1020 is electrically connected to the second acousto-electric conversion device 1018, and generates the corresponding second pickup audio information according to the second audio signal. The second wireless communication module 1022 is electrically connected to the second audio processing module 1020, and transmits the second pickup audio information to the basic communication module 1006 in a wireless manner. The wireless communication mode of the second wireless communication module 1022 may include one or more of Bluetooth communication, WIFI communication, infrared communication, radio frequency communication, and other wireless communication modes. The second wireless communication module 1022 and the basic communication module 1006 have at least one same wireless communication mode, such that the second wireless communication module 1022 may establish a wireless communication connection with the basic communication module 1006. In one embodiment, the second wireless communication module 1022 may realize the communication connection in a short distance wireless transmission mode (for example, Bluetooth).

The second sound reception unit 1016 may be one, or may also be plural. In one embodiment, the second sound reception units 1016 are plural; and a plurality of second sound reception units 1016 are respectively communicated with the basic communication module 1006. The basic communication module 1006 respectively receives the second pickup audio information from the plurality of second sound reception units 1016. The communication terminal 1000 acquires the corresponding returned audio information according to the first pickup audio information and a plurality of second pickup audio information.

In some embodiments, the basic communication module 1006 receives the first pickup audio information from the first sound reception unit 1004, receives the second pickup audio information from the second sound reception unit 1016, and then transmits the first pickup audio information and the second pickup audio information to the external device, that is, the returned audio information includes the first pickup audio information and the second pickup audio information. The first sound reception unit 1004 may be connected to the basic communication module 1006 in a wireless manner, or may also be connected to the basic communication module 1006 in a wired manner.

In some embodiments, with reference to FIG. 5, the above description of FIG. 5, and FIG. 9, the first sound reception unit 1004 is electrically connected to the basic communication module 1006. The basic communication module 1006 receives the second pickup audio information PA2 from the second sound reception unit 1016 in a wireless manner, and then transmits the second pickup audio information PA2 to the first sound reception unit 1004. The first audio processing module 1010 performs an audio mixing process on the first pickup audio information PA1 and the second pickup audio information PA2 according to the preset rule or the input of the user, acquires the corresponding returned audio information TX according to the audio mixing result, and transmits the returned audio information TX to the basic communication module 1006.

In some embodiments, with reference to FIG. 7-8, the above descriptions of FIG. 7-8, and FIG. 9-10, the communication terminal further includes a third audio processing module 1004. The first sound reception unit 1004 of the sound reception assembly 1002 transmits the first pickup audio information PA1 to the basic communication module 1006 in a wireless manner; the second sound reception unit 1016 of the sound reception assembly 1002 transmits the second pickup audio information PA2 to the basic communication module 1006 in a wireless manner; and the basic communication module 1006 transmits the first pickup audio information PA1 and the second pickup audio information PA2 to the third audio processing module 1014. The third audio processing module 1014 is configured to perform an audio mixing process on the first pickup audio information PA1 and the second pickup audio information PA2 according to the preset rule or the input of the user, and acquire the corresponding returned audio information TX according to the audio mixing result. The third audio processing module 1014 further transmits the returned audio information TX to the basic communication module 1006.

Figure 11:
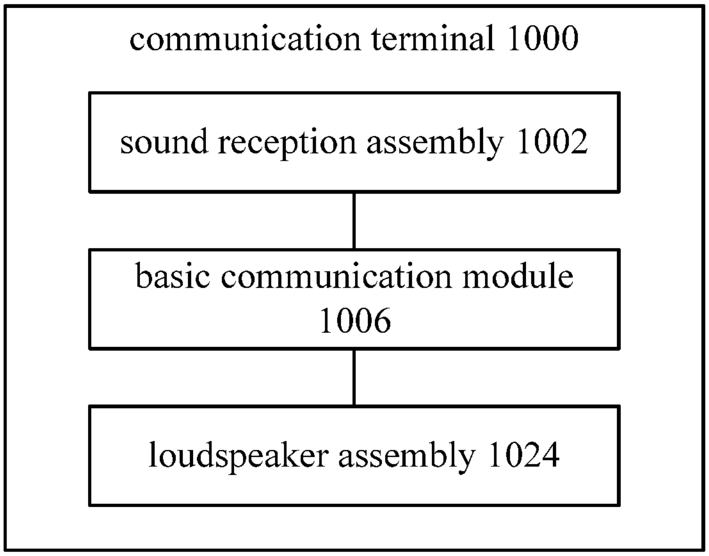
FIG. 11 is a structural block diagram of the fourth embodiment of the communication terminal according to embodiments of the present disclosure.

FIG. 11 is a structural block diagram of the fourth embodiment of the communication terminal according to embodiments of the present disclosure.

With reference to FIG. 11, in some embodiments, the communication terminal 1000 may further include a loudspeaker assembly 1024; and the basic communication module 1006 is further configured to receive stand-by audio information from the external device. The loudspeaker assembly 1024 is connected to the basic communication module 1006 in a wired or wireless manner, so as to receive and play the stand-by audio information. For example, the loudspeaker assembly 1024 is electrically connected to the basic communication module 1006, so as to transmit the stand-by audio information.

In the present disclosure, the stand-by audio information may be the audio information generated by external device, read from machine readable storage medium, and acquired in a wired or wireless communication manner or by other means. For example, the stand-by audio information may be audio data stored in an external device; in one application scenario, the user may operate the external device (for example, a computer), such that the external device transmits the stand-by audio information to the basic communication module 1006 to display the corresponding audio data. For another example, the external device is connected to other devices for the conference at another geographic positions by means of a wired or wireless network, and receives the stand-by audio information (for example, the sound of conference attenders acquired by the other devices for the conference) from the other devices for the conference.

In the present disclosure, the loudspeaker assembly 1024 may include an electro-acoustic conversion device and a corresponding audio processing circuit. The electro-acoustic conversion device may include one or more of piezoelectric loudspeaker, electromagnetic loudspeaker, electrostatic loudspeaker, and other forms of electro-acoustic conversion devices. The audio processing circuit converts the stand-by audio information into corresponding analog electrical signal, and transmits the analog electrical signal to the electro-acoustic conversion device; and the electro-acoustic conversion device converts the analog electrical signal into an acoustic signal, so as to play the stand-by audio information. The audio processing circuit may include a power amplification circuit for driving the electro-acoustic conversion device to produce sound.

In some embodiments, the basic communication module 1006 further transmits the received stand-by audio information to other devices in communication with the communication terminal 1000 or other parts in addition to the loudspeaker assembly 1024 on the communication terminal 1000. In a wireless communication system, the signal communication mode between a transmitter and a receiver includes unicast, multicast, broadcast and the like. In the present application, unicast means that the transmitter transmits a signal to a specific receiver, and is a one-to-one communication mode; multicast means that the transmitter transmits a signal to a plurality of receivers joining in a specific group, that is, the receivers joining the same group may receive all the data in the group; and broadcast means that the transmitter transmits a signal to all the receivers in the wireless network. As required in practical use, the basic communication module 1006 may transmit the stand-by audio information to other parts of the communication terminal 1000 or other devices in addition to the communication terminal 1000 in at least one manner of unicast, multicast or broadcast. In one application scenario, the basic communication module 1006 may transmit the received stand-by audio information to specific other devices (for example, other communication terminal or wireless loudspeaker box and the like) paired with the basic communication module in a unicast or multicast manner, so as to play the stand-by audio information or perform other processes on the stand-by audio information. In another application scenario, the basic communication module 1006 may broadcast the stand-by audio information to a certain region, such that all the relevant devices in the certain region may receive the stand-by audio information. For example, the basic communication module 1006 may broadcast and transmit the stand-by audio information to all the devices in a corresponding Bluetooth network in a Bluetooth broadcasting manner. The first sound reception unit 1004 may receive the broadcast stand-by audio information in a wireless manner.

In some embodiments, other devices paired with the communication terminal may perform an echo cancellation process on the acquired audio signal according to the stand-by audio information.

During an audio conference, the communication terminal or other sound reception apparatus at a first place may acquire the sound of users at the first place, or may also acquire the sound received from devices attending the audio conference at a second place and played by a loudspeaker at the first place. The sound at the second place is reproduced by the loudspeaker at the first place; the sound acquired by the sound reception apparatus at the first place is called as echo. Under the situation that the echo is generated, if the sound is transmitted to the second place without canceling, then the loudspeaker at the second place will reproduce the sound of the second place after a certain time, thereby causing inconvenience and trouble to the communication of users attending the conference. The users may communicate more smoothly by canceling the echo. The echo generally may be canceled according to an echo transmission characteristic; specifically, the echo is canceled by obtaining a corresponding echo feedback signal according to the signal played by the loudspeaker, and then using a filter to subtract the echo feedback signal from the acoustic signal acquired by the sound reception apparatus.

Figure 12:
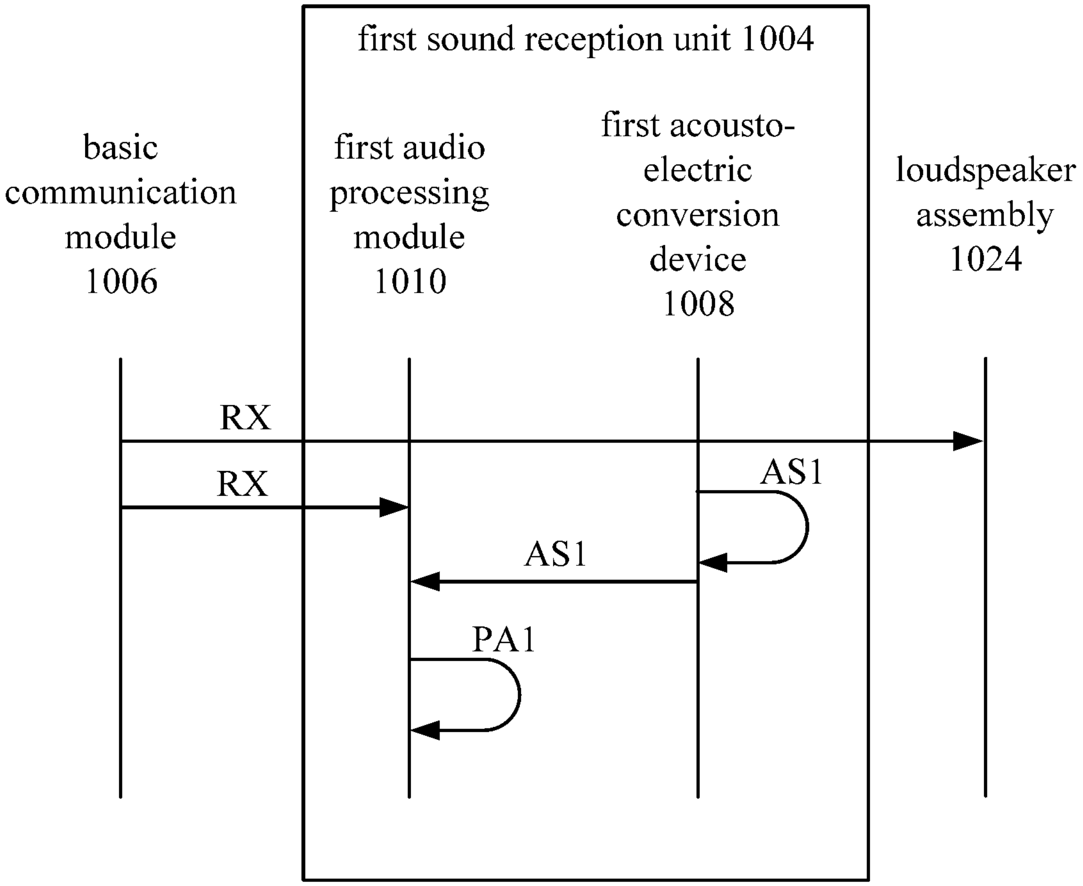
FIG. 12 is a schematic view of information flow direction when a first sound reception unit performs an echo cancellation process according to embodiments of the present disclosure.
Figure 13:
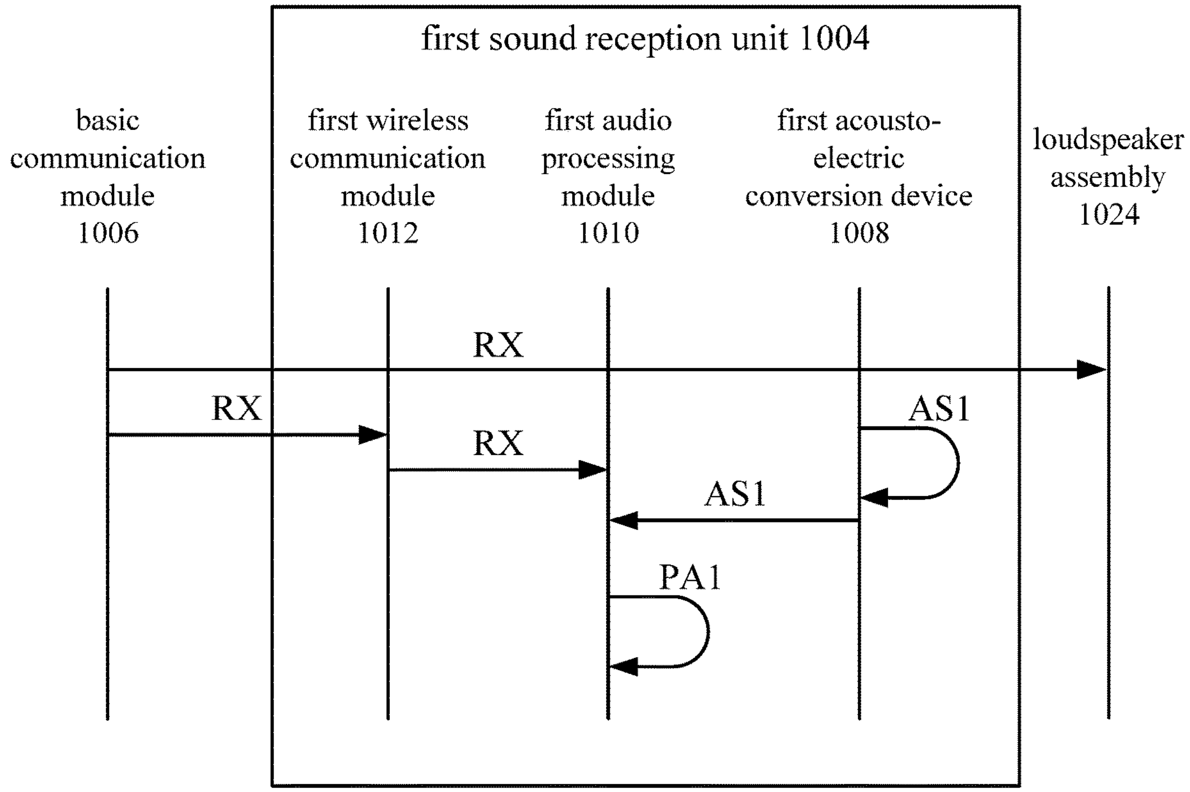
FIG. 13 is a schematic view of information flow direction when another first sound reception unit performs an echo cancellation process according to embodiments of the present disclosure.

FIG. 12 is a schematic view of information flow direction when the first sound reception unit performs an echo cancellation process according to embodiments of the present disclosure. FIG. 13 is a schematic view of an information flow direction when another first sound reception unit performs an echo cancellation process according to embodiments of the present disclosure.

With reference to FIG. 12-13, further, in some embodiments, the basic communication module 1006 further transmits the received stand-by audio information RX to the first sound reception unit 1004. Under the situation that the first sound reception unit 1004 is connected to the basic communication module 1006 in a wired manner, the basic communication module 1006 transmits the stand-by audio information RX to the first audio processing module 1010, as shown in FIG. 12. Under the situation that the first sound reception unit 1004 is connected to the basic communication module 1006 in a wireless manner, the basic communication module 1006 transmits the stand-by audio information RX to the first wireless communication module 1012 of the first sound reception unit 1004; and the first wireless communication module 1012 transmits the stand-by audio information RX to the first audio processing module 1010, as shown in FIG. 13. Under the situation that the loudspeaker assembly 1024 plays the stand-by audio information RX, the first audio signal AS1 generated by the first acousto-electric conversion device 1008 contains an echo. The first audio processing module 1010 is further configured to follow the preset rule or the input of the user to perform an echo cancellation process on the first audio signal AS1 according to the stand-by audio information RX, and generate the corresponding first pickup audio information PA1 according to the echo cancellation processing result. The communication terminal 1000 may further measure the distance between the first sound reception unit 1004 and the loudspeaker assembly 1024; the first audio processing module 1010 may further perform an echo cancellation process on the first audio signal AS1 according to the measured distance between the first sound reception unit 1004 and the loudspeaker assembly 1024, so as to achieve a better echo cancellation effect.

Figure 14:
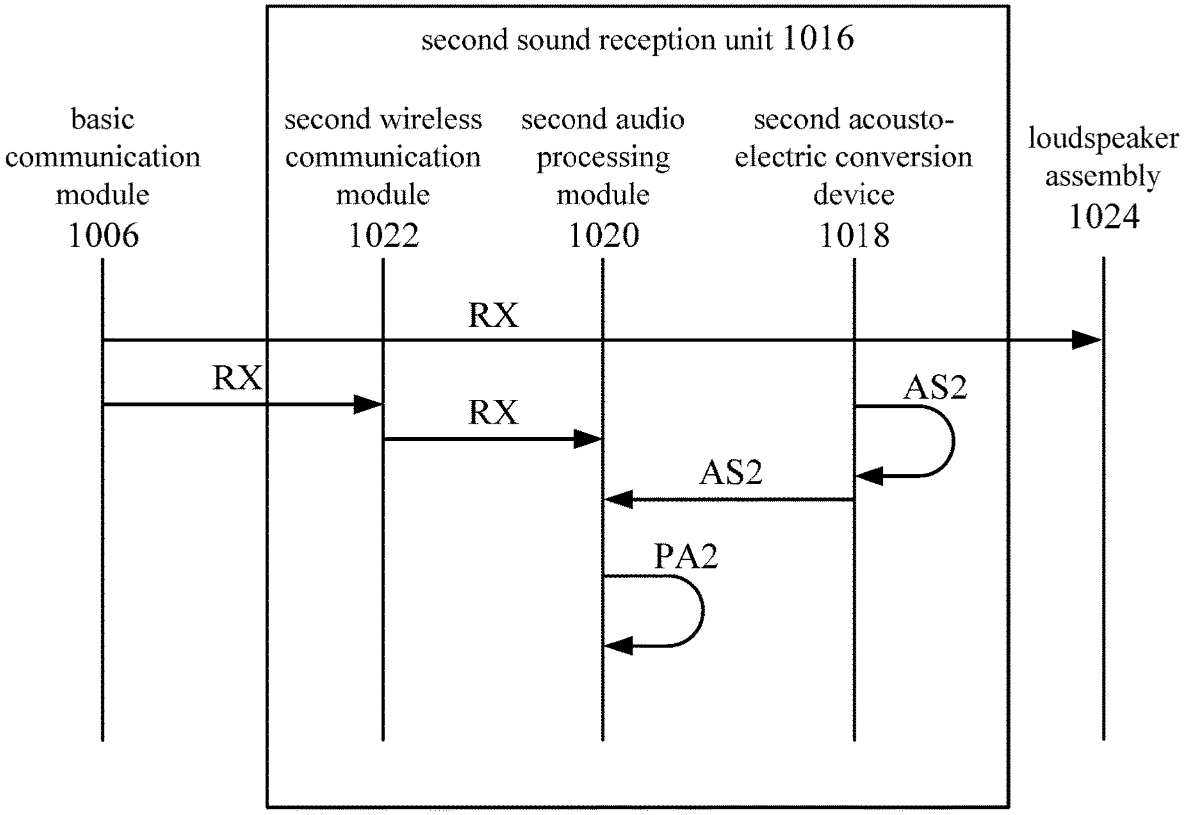
FIG. 14 is a schematic view of information flow direction when the second sound reception unit performs an echo cancellation process according to embodiment of the present disclosure.

FIG. 14 is a schematic view of information flow direction when the second sound reception unit performs an echo cancellation process according to embodiments of the present disclosure.

With reference to FIG. 14, in some embodiments, the basic communication module 1006 further transmits the received stand-by audio information RX to the second sound reception unit 1016. The basic communication module 1006 transmits the stand-by audio information RX to the second wireless communication module 1022 of the second sound reception unit 1016; and the second wireless communication module 1022 transmits the stand-by audio information RX to the second audio processing module 1020. Under the situation that the loudspeaker assembly 1024 plays the stand-by audio information RX, the second audio signal AS2 generated by the second acousto-electric conversion device 1018 contains an echo. The second audio processing module 1020 is further configured to follow the preset rule or the input of the user to perform an echo cancellation process on the second audio signal AS2 according to the stand-by audio information RX, and generate corresponding second pickup audio information PA2 according to the echo cancellation processing result. The communication terminal 1000 may further measure a distance between the second sound reception unit 1016 and the loudspeaker assembly 1024; the second audio processing module 1020 may further perform an echo cancellation process on the second audio signal AS2 according to the measured distance between the second sound reception unit 1016 and the loudspeaker assembly 1024, so as to achieve a better echo cancellation effect.

Figure 15:
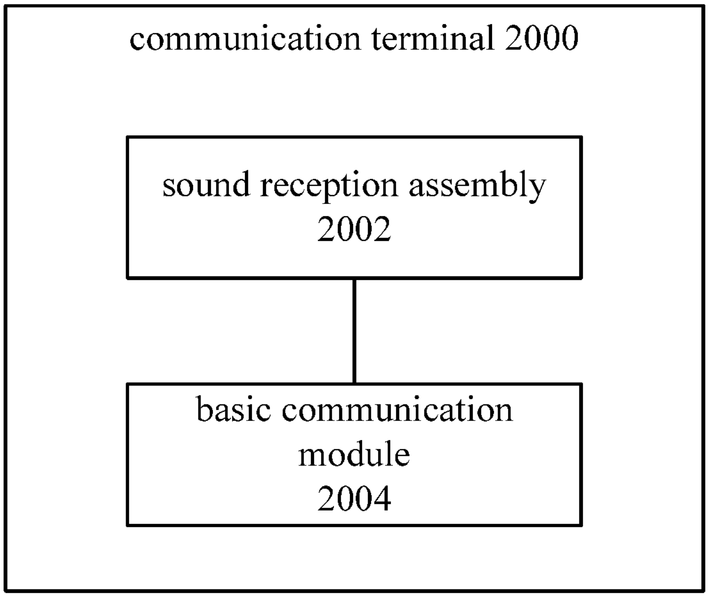
FIG. 15 is a structural block diagram of the fifth embodiment of the communication terminal according to embodiments of the present disclosure.

FIG. 15 is a structural block diagram of the fifth embodiment of the communication terminal according to embodiments of the present disclosure.

With reference to FIG. 15, the embodiment of the present disclosure further provides a communication terminal 2000, the communication terminal 2000 including a sound reception assembly 2002 and a basic communication module 2004. The sound reception assembly 2002 is configured to pick up sound to generate first pickup audio information. In some embodiments, the sound reception assembly 2002 may be the same as the sound reception assembly 1002 as shown in FIG. 3-14 and described with reference to FIG. 3-14. The basic communication module 2004 is configured to be paired with other communication terminals in a wireless manner, and transmit the returned audio information to the paired other communication terminals, wherein the returned audio information is acquired according to the first pickup audio information. The other communication terminals may be any communication terminal capable of communicating with the communication terminal in a wireless manner. For example, in one use scenario, the other communication terminals may be the communication terminal 1000 as shown in FIG. 3-14 and described above with reference to FIG. 3-14.

In some embodiments, the communication terminal 2000 as shown in FIG. 15 may be the first to fourth communication terminals 1000 as shown in FIG. 3-14 and described above with reference to FIG. 3-14. For example, with reference to FIG. 3-5, the basic communication module 1006 of the first communication terminal 1000 is further configured to be paired with other communication terminals in a wireless manner, and transmit the generated returned audio information to the mated other communication terminals; therefore, the basic communication module 1006 has the function of the basic communication module 2004.

Figure 16:
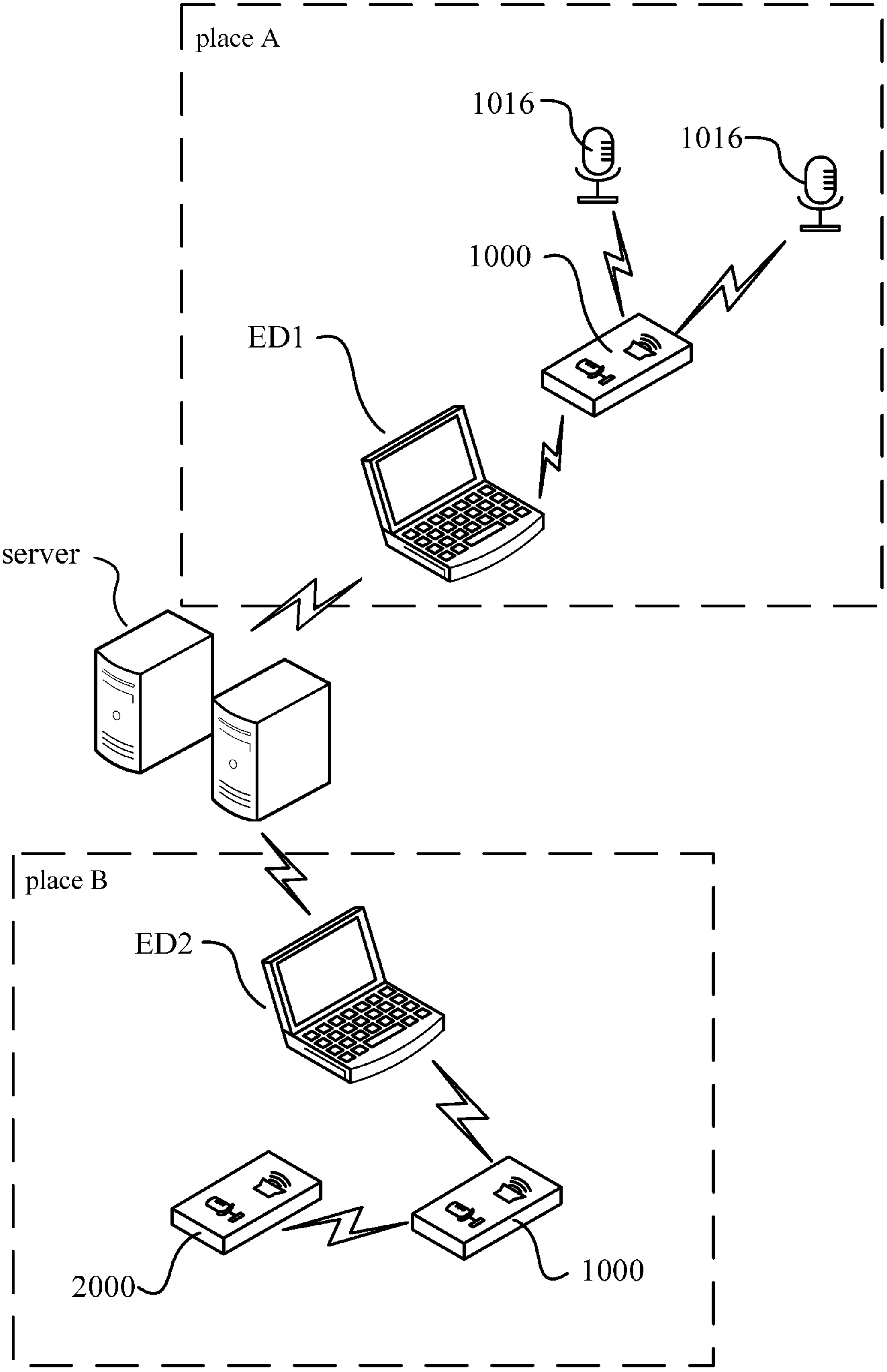
FIG. 16 is a schematic view of a basic architecture using the communication terminal to realize a remote conference according to embodiments of the present disclosure.

FIG. 16 is a schematic view of a basic architecture using the communication terminal to realize a remote conference according to embodiments of the present disclosure.

With reference to FIG. 16, in one application scenario, the users at the place A and the place B hold a remote conference. One communication terminal 1000 is used at the place A; and the communication terminal 1000 is communicatively connected to the external device ED1 (for example, a computer) in a wireless manner. The communication terminal 1000 at the place A includes two second sound reception units 1016, wherein the two second sound reception units 1016 are respectively communicated with the communication terminal 1000 in a wireless manner. One communication terminal 1000 and one communication terminal 2000 are used at the place B; the communication terminal 1000 is communicated with the external device ED2 (for example, a computer) in a wireless manner; and the communication terminal 2000 is connected to the communication terminal 1000. The external device ED1 at the place A and the external device ED2 at the place B are respectively in communication with a server by network, thereby realizing information communication between the external device ED1 and the external device ED2. The communication terminal 1000 at the place A generates returned audio information, and then transmits the returned audio information to the external device ED 1; and the external device ED1 transmits the returned audio information to the external device ED2 by server. The external device ED2 takes the returned audio information transmitted by the external device ED1 as stand-by audio information, and transmits the audio information to be played to the communication terminal 1000 at the place B, such that the communication terminal 1000 plays the audio information to be played. The communication terminal 2000 at the place B generates the returned audio information, and then transmits the returned audio information to the communication terminal 1000 at the place B; the communication terminal 1000 takes the returned audio information transmitted by the communication terminal 2000 as second pickup audio information; the communication terminal 1000 generates returned audio information according to the second pickup audio information from the communication terminal 2000 and the first pickup audio information generated by the communication terminal 1000, and transmits the generated returned audio information to the external device ED2. The external device ED2 receives the returned audio information transmitted by the communication terminal 1000 at the place B, and transmits the received returned audio information to the external device ED1 at the place A by the server; therefore, the users at the places A and B may hold a remote audio conference.

Figure 17:
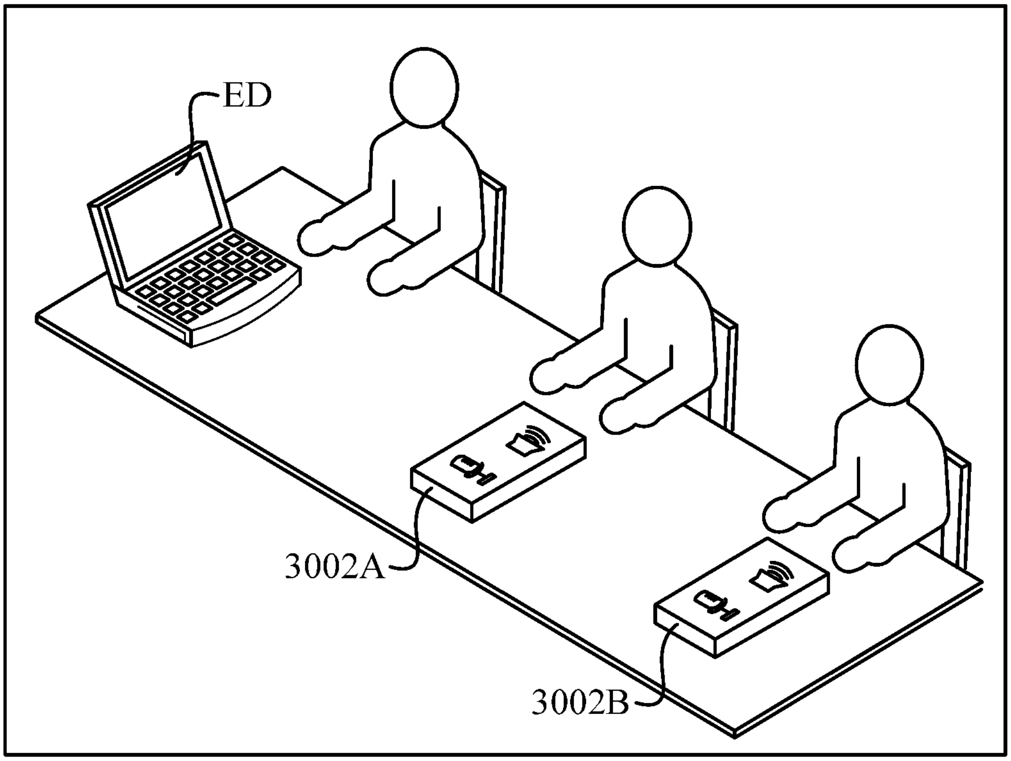
FIG. 17 is a schematic view of a use scenario of a communication system according to embodiments of the present disclosure.
Figure 18:
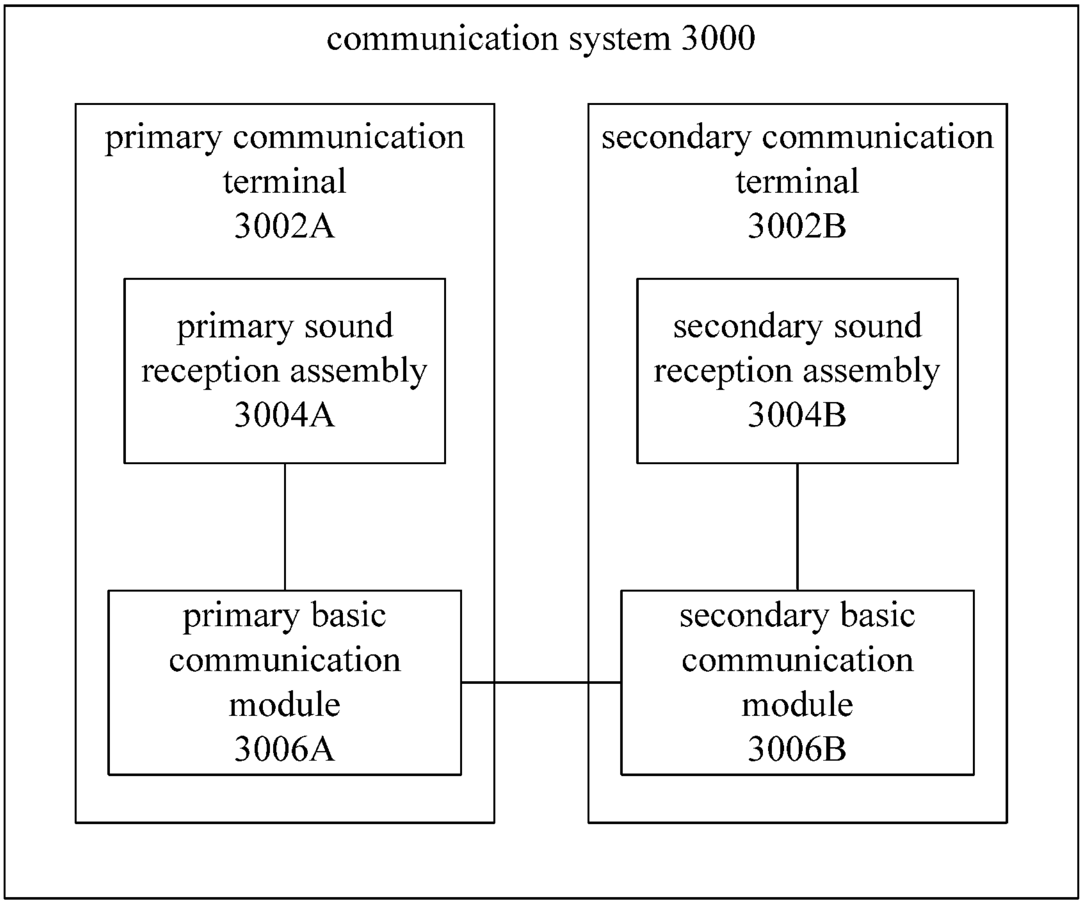
FIG. 18 is a structural block diagram of a communication system according to embodiments of the present disclosure.
Figure 19:
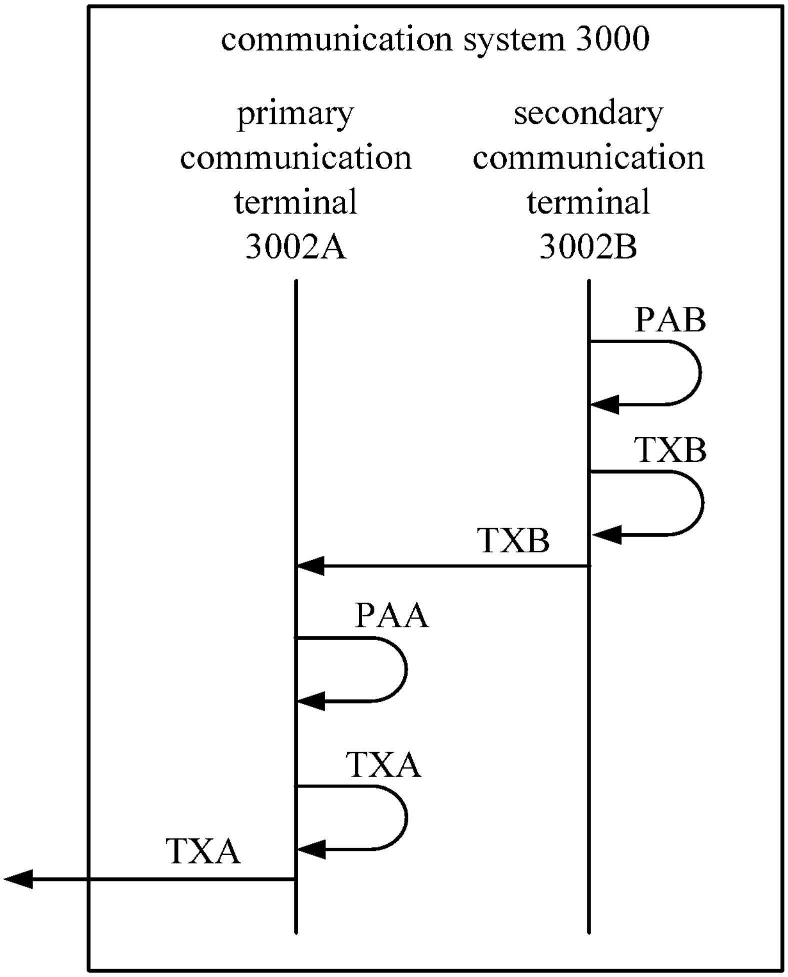
FIG. 19 is a schematic view of information flow direction when the communication system operates according to embodiments of the present disclosure.

FIG. 17 is a schematic view of a use scenario of the communication system according to embodiments of the present disclosure. FIG. 18 is a structural block diagram of the communication system according to embodiments of the present disclosure. FIG. 19 is a schematic view of information flow direction when the communication system operates according to embodiments of the present disclosure.

With reference to FIG. 17-19, an embodiment of the present disclosure further provides a communication system 3000. The communication system 3000 includes a primary communication terminal 3002A and at least one secondary communication terminal 3002B. The primary communication terminal 3002A includes a primary basic communication module 3006A and a primary sound reception assembly 3004A; the secondary communication terminal 3002B includes a secondary basic communication module 3006B and a secondary sound reception assembly 3004B. The secondary sound reception assembly 3002B is configured to pick up sound to generate secondary pickup audio information PAB. The secondary basic communication module 3006B may establish a wireless communication connection with the primary basic communication module 3006A. The secondary basic communication module 3006B is configured to transmit the secondary returned audio information TXB to the primary basic communication module 3006A in a wireless manner, wherein the secondary returned audio information TXB is acquired according to the secondary pickup audio information PAB. The primary sound reception assembly 3004A is configured to pick up sound to generate primary pickup audio information PAA. The primary basic communication module 3006A is further configured to transmit primary returned audio information TXA to the external device ED, wherein the primary returned audio information TXA is acquired according to the primary pickup audio information PAA and the secondary returned audio information TXB. Therefore, in the embodiment of the present disclosure, the communication system 3000 realizes the association of a plurality of communication terminals, and realizes the synchronous sound reception of a plurality of communication terminals; the primary communication terminal processes sound reception results of the plurality of communication terminals, such that the primary returned audio information received by the external device ED has a better sound effect, thereby reducing the calculation amount when the external device ED processes the audio information, and avoiding the situation that the external device ED may only receive the audio information transmitted by a few communication terminals due to the limitation of network bandwidth.

The secondary communication terminal 3002B may be one, or may also be plural. In some embodiments, the secondary communication terminals 3002B are plural; and a plurality of secondary communication terminals 3002B are respectively communicated with the primary communication terminal 3002A in a wireless manner, so as to transmit signals.

In some embodiments, the primary communication terminal 3002A is further configured to perform an audio mixing process on the primary pickup audio information and the secondary pickup audio information to acquire the returned audio information.

Figure 20:
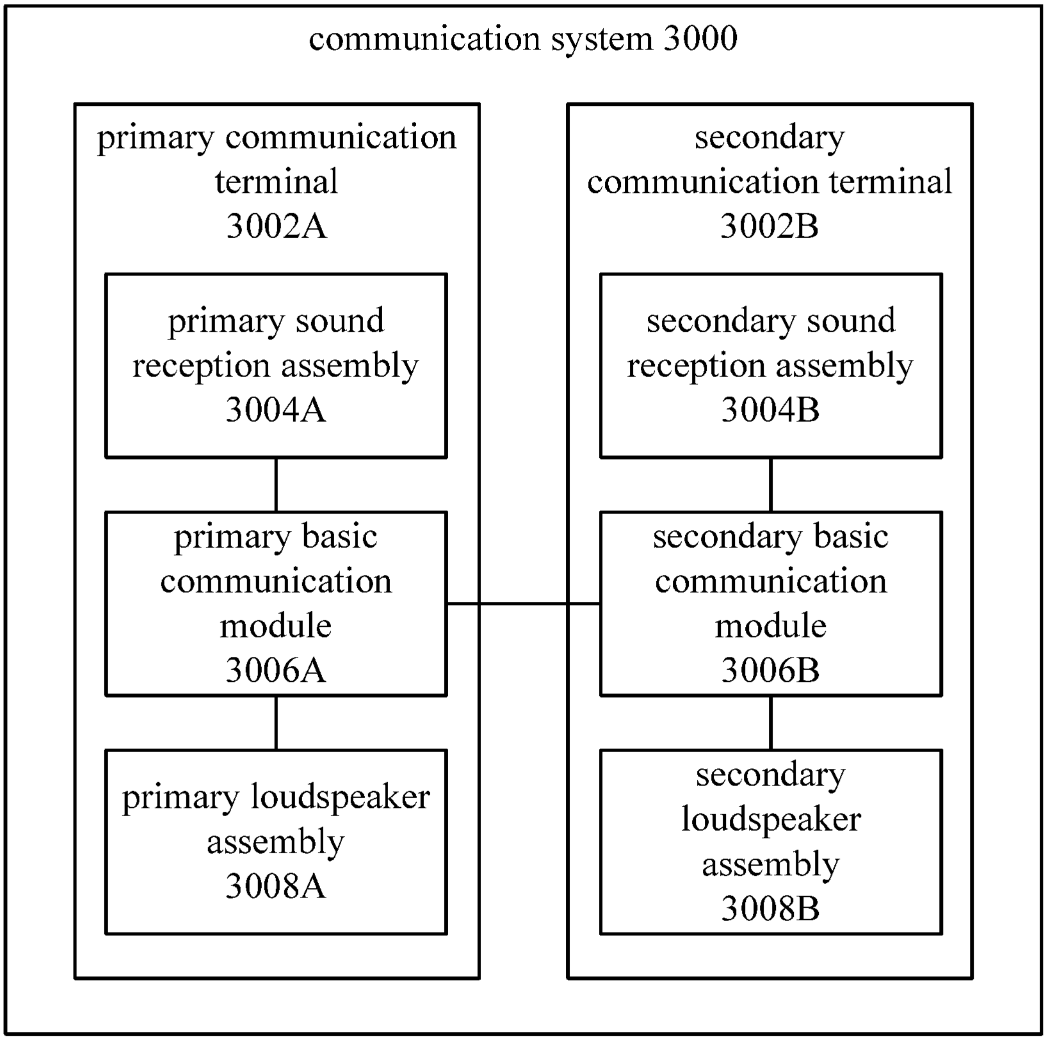
FIG. 20 is a structural block diagram of another communication system according to embodiments of the present disclosure.

FIG. 20 is a structural block diagram of another communication system according to embodiments of the present disclosure.

With reference to FIG. 20, in some embodiments, the primary communication terminal 3002A further includes a primary loudspeaker assembly 3008A; and the primary basic communication module 3006A is further configured to receive the stand-by audio information from the external device. The primary basic communication module 3006A transmits the received stand-by audio information to the primary loudspeaker assembly 3008A, and the primary loudspeaker assembly 3008A may play the stand-by audio information.

Figure 21:
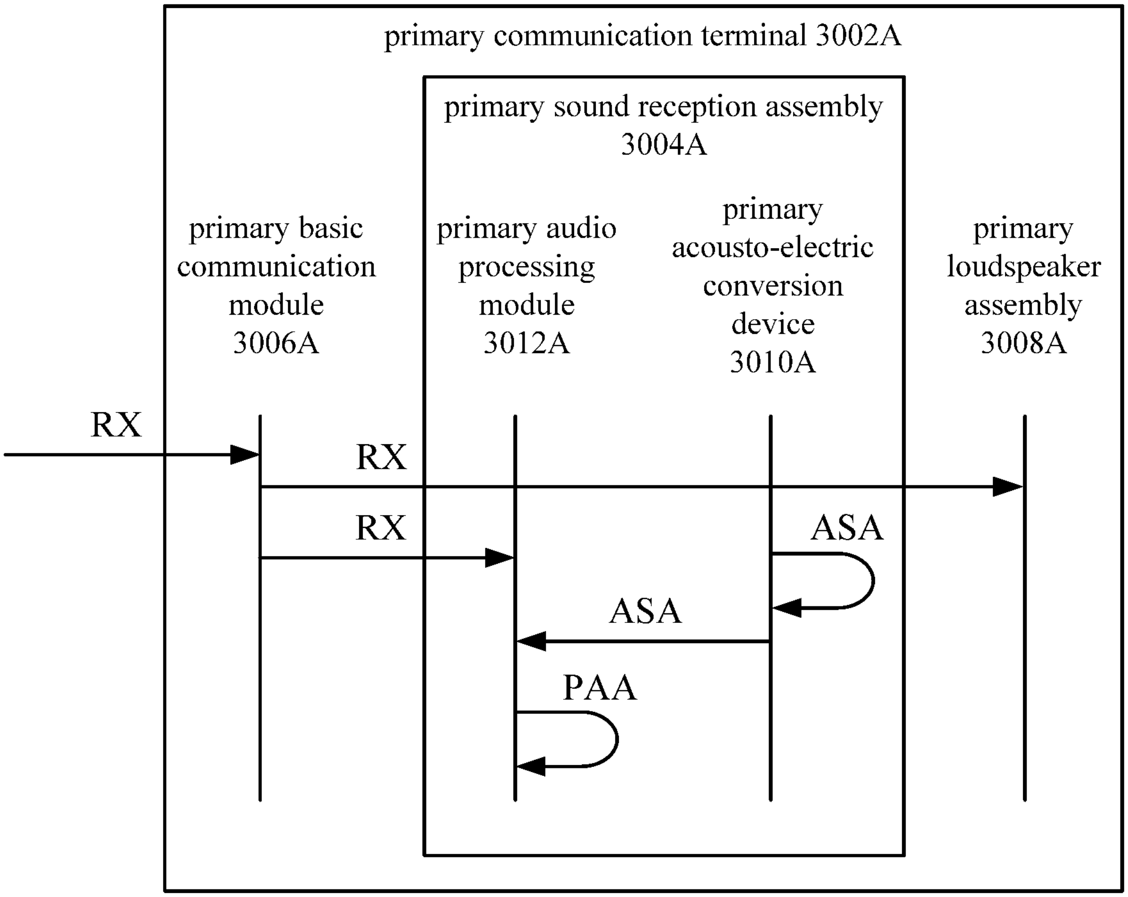
FIG. 21 is a schematic view of information flow direction when the primary communication terminal performs an echo cancellation process according to embodiments of the present disclosure.

FIG. 21 is a schematic view of information flow direction when a primary communication terminal performs an echo cancellation process according to embodiments of the present disclosure.

Further, the primary communication terminal 3002A may also utilize the received audio information to be played to perform an echo cancellation process on the acquired sound, so as to generate the primary pickup audio information PAA. With reference to FIG. 17, in some embodiments, the primary sound reception assembly 3004A includes a primary acousto-electric conversion device 3010A and a primary audio processing module 3012A. The primary acousto-electric conversion device 3010A is configured to pick up sound, and convert the picked acoustic signal into an electrical signal to generate a primary audio signal ASA. The primary acousto-electric conversion device 3010A may include one or more of piezoelectric microphone, electromagnetic microphone, electret microphone, and other forms of acousto-electric conversion devices. The primary audio processing module 3012A receives the primary audio signal ASA, and performs an echo cancellation process on the primary audio signal ASA according to the stand-by audio information RX, so as to generate the primary pickup audio information PAA.

Still with reference to FIG. 20, in some embodiments, the secondary communication terminal 3002B further includes a secondary loudspeaker assembly 3008B. The secondary basic communication module 3006B may receive the stand-by audio information, and transmit the stand-by audio information to the secondary loudspeaker assembly 3008B; and the secondary loudspeaker assembly 3008B may play the stand-by audio information. The secondary basic communication module 3006B may receive the stand-by audio information from the primary communication terminal 3002A and/or external of the communication system 3000. In one embodiment, the primary basic communication module 3006A is further configured to acquire the stand-by audio information from the external of the communication system 3000 in a wired or wireless manner, and transmit the stand-by audio information to the secondary communication terminal 3002B in a wireless manner, such that the secondary loudspeaker assembly 3008B may play the stand-by audio information. When the communication system 3000 includes a plurality of secondary communication terminals 3002B; and the plurality of secondary communication terminals 3002B are respectively communicated with the primary communication terminal 3002A, the primary communication terminal 3002A may follow the preset rule or the input of the user to transmit the stand-by audio information to all the secondary communication terminals 3002B communicate with the primary communication terminal or some of the secondary communication terminals 3002B. In another embodiment, the secondary communication terminal 3002B may also acquire the stand-by audio information from the external of the communication system 3000; for example, the external device is respectively communicated with the primary communication terminal 3002A and the secondary communication terminal 3002B, and respectively transmits the stand-by audio information to the primary communication terminal 3002A and the secondary communication terminal 3002B.

Figure 22:
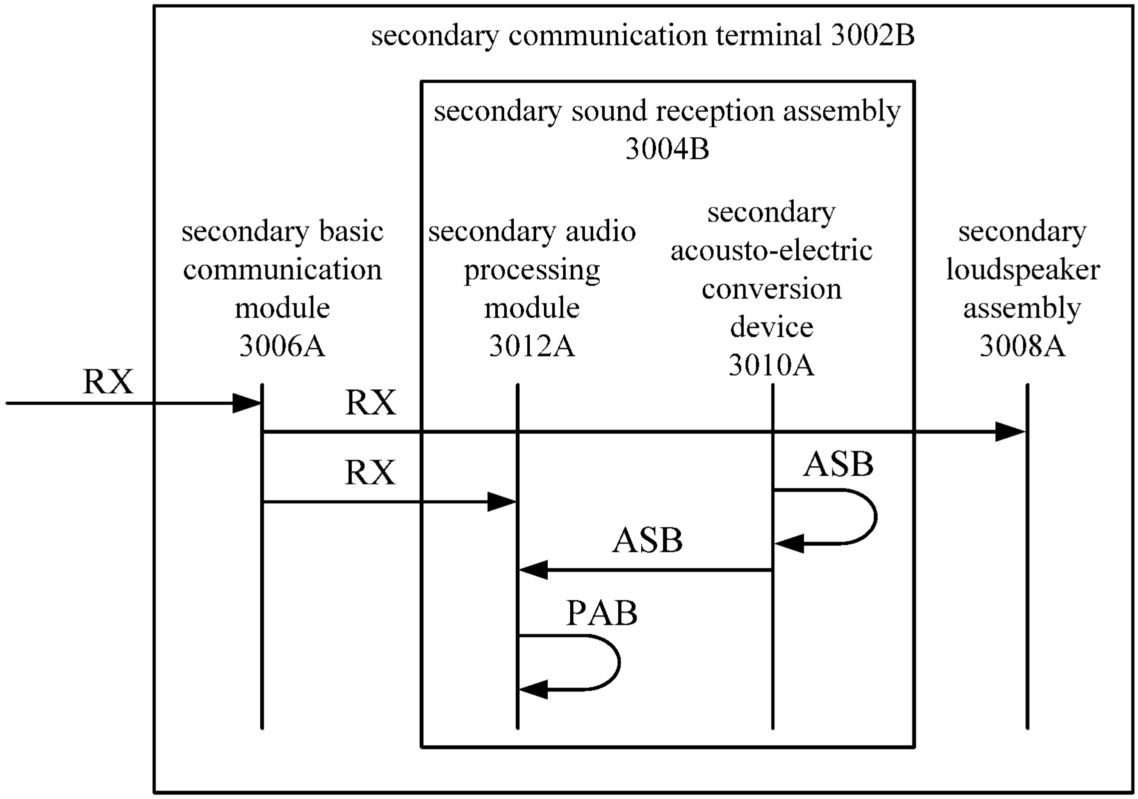
FIG. 22 is a schematic view of information flow direction when the secondary communication terminal performs an echo cancellation process according to embodiments of the present disclosure.

FIG. 22 is a schematic view of information flow direction when the secondary communication terminal performs an echo cancellation process according to embodiments of the present disclosure.

Further, the secondary communication terminal 3002B may utilize the received audio information to be played to perform an echo cancellation process on the acquired sound, so as to generate the secondary pickup audio information. With reference to FIG. 22, in some embodiments, the secondary sound reception assembly 3004B includes a secondary acousto-electric conversion device 3010B and a secondary audio processing module 3012B. The secondary acousto-electric conversion device 3010B is configured to pick up sound, and convert a picked acoustic signal into an electrical signal to generate a secondary audio signal ASB. The secondary acousto-electric conversion device 3010B may include one or more of piezoelectric microphone, electromagnetic microphone, electret microphone, and other forms of acousto-electric conversion devices. The secondary audio processing module 3012B receives the secondary audio signal ASB, and performs an echo cancellation process on the secondary audio signal ASB according to the stand-by audio information RX, so as to generate the secondary pickup audio information PAB.

Figure 23:
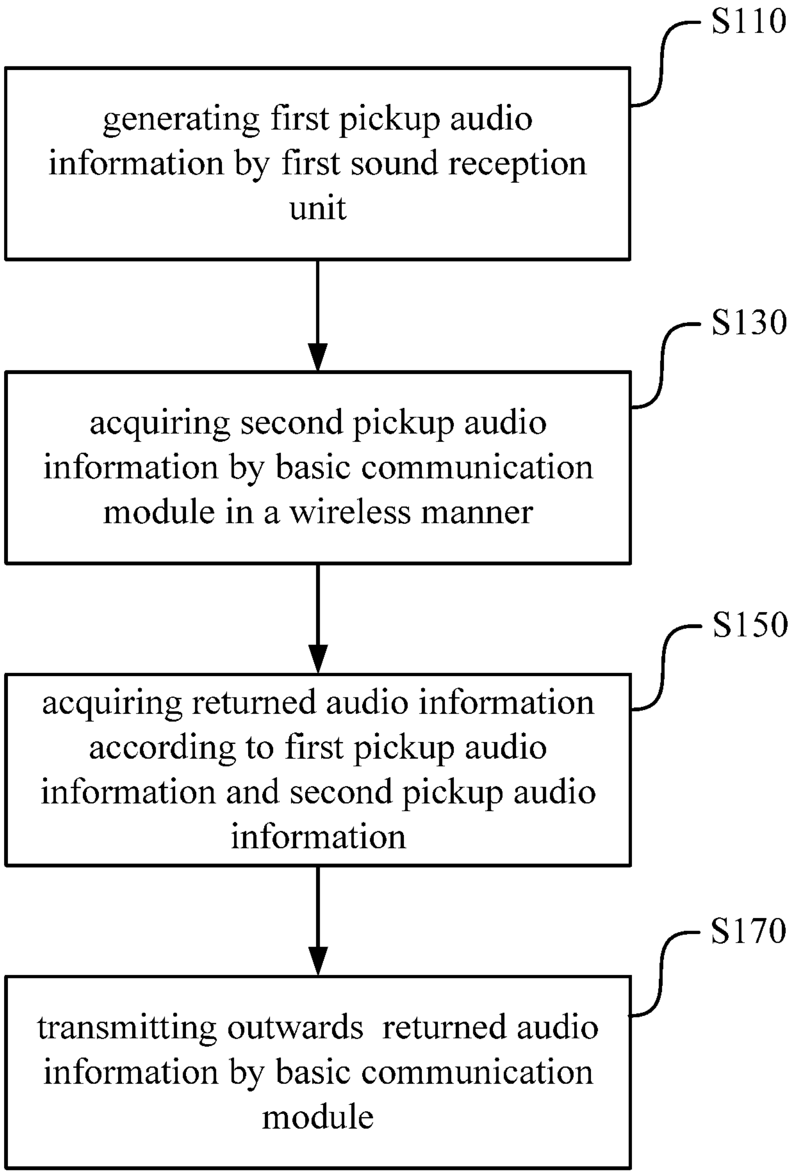
FIG. 23 is a flow chart of an audio information processing method according to embodiments of the present disclosure.

FIG. 23 is a flow chart of an audio information processing method according to embodiments of the present disclosure.

The present disclosure further provides an audio information processing method, applied to a communication terminal. The audio information processing method may be applied to the communication terminal as shown in FIG. 3-14. With reference to FIG. 23, in some embodiments, the audio information processing method includes steps S110-S170 as follows:

Step S110, generating first pickup audio information by first sound reception unit.

The communication terminal includes a first sound reception unit. The first sound reception unit picks up sound, and generates the first pickup audio information on the basis of the picked sound.

Step S130, acquiring second pickup audio information by basic communication module in a wireless manner.

The basic communication module has a wireless communication function. The basic communication module establishes a wireless communication connection with other devices capable of picking up sound, and acquires the second pickup audio information in a wireless manner, wherein the other devices capable of picking up sound may generate the second pickup audio information. The other devices capable of picking up sound may be the pickup apparatus in addition to the first sound reception unit on the communication terminal, or may also be other communication terminals paired with the basic communication module, or other devices connected to the basic communication module in a wireless manner and capable of picking up sound. The basic communication module may acquire one or more second pickup audio information from one or more sources. For example, the basic communication module may respectively establish wireless communication connections with a plurality of other communication terminals, and respectively acquire the second pickup audio information from the plurality of other communication terminals, so as to acquire a plurality of second pickup audio information. When the basic communication module acquires the plurality of second pickup audio information from a plurality of sources, the plurality of sources may be different types of sources.

According to different sources of the second pickup audio information acquired by the basic communication module, the step S130 may include at least one of step S130*a* and step S130*b* as follows:

Step S130*a*, acquiring the second pickup audio information by the basic communication module in a wireless manner from other communication terminals paired with the basic communication module.

The basic communication module may be paired with the other communication terminals to establish a wireless communication connection, and receive the second pickup audio information generated by the other communication terminals by picking up sound from the other communication terminals. For example, the basic communication module may be communicated with other communication terminals in a short distance wireless communication mode, such as Bluetooth, to transmit signals. The other communication terminals may have the same structure as the communication terminal, or may also have a different structure.

Step S130*b*, acquiring the second pickup audio information by the basic communication module in a wireless manner from second sound reception unit.

The communication terminal further includes a second sound reception unit, wherein the second sound reception unit is in communication with the basic communication module in a wireless manner. The basic communication module acquires the second pickup audio information from the second sound reception unit. In one embodiment, before the step S130*b*, the method further includes step S120, generating second pickup audio information by the second sound reception unit. The second sound reception unit picks up sound, and generates the corresponding second pickup audio information on the basis of the picked sound. Specifically, the step S120 may include steps S121-S123 as follows:

Step S121, picking up sound to generate second audio signal by the second sound reception unit.

The communication terminal further includes a second sound reception unit, wherein the second sound reception unit is configured to pick up sound, and convert the acoustic signal into a corresponding electrical signal to generate a second audio signal.

Step S123, generating the second pickup audio information according to the second audio signal.

The second sound reception unit further preforms a corresponding process on the second pickup audio information according to the predetermined mode or the input of the user, and acquires the second pickup audio information.

After the step S120, the communication terminal executes step S130*b*, acquiring the second pickup audio information by the basic communication module in a wireless manner from the second sound reception unit. According to requirements of use scenario for sound reception, the second sound reception unit may be one or plural. In a feasible embodiment, the second sound reception units are plural; the basic communication module respectively acquires the second pickup audio information from the plurality of second sound reception units, so as to acquire a plurality of second pickup audio information.

The step S130 may include both step S130*a* and step S130*b*. For example, the communication terminal includes a second sound reception unit; the basic communication module establishes a communication connection with the second sound reception unit and the other communication terminals;

the second sound reception unit and the other communication terminals simultaneously receive sound; the basic communication module respectively acquires the plurality of second pickup audio information from the second sound reception unit and the other communication terminals in a wireless manner.

Step S150, acquiring returned audio information according to the first pickup audio information and the second pickup audio information.

The communication terminal follows the preset rule or the input of the user to acquire the corresponding returned audio information according to the first pickup audio information and the second pickup audio information. The returned audio information may reflect the first pickup audio information and the second pickup audio information, or may also reflect only the first pickup audio information or the second pickup audio information as required in practical use.

In some embodiments, further, the step S150 may include step S151 as follows:

Step S151, performing an audio mixing process on the first pickup audio information and the second pickup audio information to acquire the returned audio information.

The communication terminal includes a corresponding audio processing module, wherein the audio processing module follows the preset rule or the input of the user to perform an audio mixing process on the first pickup audio information and the second pickup audio information, so as to acquire the corresponding returned audio information.

According to different configuration modes of the audio processing module for performing the audio mixing process, the step S151 may include step S151*a* or step S151*b* as follows:

Step 151*a*, performing, by the first sound reception unit, an audio mixing process on the first pickup audio information and the second pickup audio information to acquire the returned audio information.

The basic communication module receives the second pickup audio information, and then transmits the second pickup audio information to the first sound reception unit, wherein the first sound reception unit is connected to the basic communication module in a wired or wireless manner. The first sound reception unit includes a first audio processing module; the first audio processing module of the first sound reception unit performs an audio mixing process on the first pickup audio information and the second pickup audio information, and acquires the returned audio information according to the audio mixing result. The first sound reception unit further transmits the returned audio information to the basic communication module.

Step S151*b*, performing, by the third audio processing module, an audio mixing process on the first pickup audio information and the second pickup audio information to acquire the returned audio information.

In some embodiments, the communication terminal further includes a third audio processing module, wherein the third audio processing module is electrically connected to the basic communication module. The first sound reception unit may be connected to the basic communication module in a wired or wireless manner. The first sound reception unit generates first pickup audio information, and then directly transmits the first pickup audio information to the third audio processing module, or transmits the first pickup audio information to the third audio processing module through the basic communication module. The basic communication module receives the second pickup audio information, and then transmits the second pickup audio information to the third audio processing module. The third audio processing module performs an audio mixing process on the received first pickup audio information and the second pickup audio information, and acquires the returned audio information according to the audio mixing result. The third audio processing module further transmits the returned audio information to the basic communication module.

Step S170, transmitting outwards the returned audio information by the basic communication module.

The basic communication module may transmit outwards the returned audio information in a wired or wireless manner. The basic communication module may transmit the returned audio information to one or more of other communication terminals, multimedia apparatus, cloud server, and other apparatuses. For example, the basic communication module may transmit the audio information to a computer, a mobile phone and the like. In one embodiment, the basic communication module establishes a communication connection with a computer in a short distance wireless communication mode (for example, Bluetooth, 2.4G), and transmits the returned audio information to the computer; the computer may communicate information with other devices used by conference attenders at the second place by means of the Internet or other communication modes, thereby satisfying the requirement for people at different places to hold a remote conference.

In some embodiments, further, after the step S110 and before the step S150, the method further includes the step of acquiring the first pickup audio information from the first sound reception unit by the basic communication module.

Specifically, the basic communication module may be connected to the first sound reception unit in a wired or wireless manner, so as to transmit signals. After the first sound reception unit generates the first pickup audio information, the first sound reception unit may actively transmit the first pickup audio information to the basic communication module, or may also transmit the first pickup audio information to the basic communication module in response to a request for acquiring the first pickup audio information from the basic communication module. The basic communication module receives the first pickup audio information from the first sound reception unit. For example, the first sound reception unit is communicated with the basic communication module in a wireless manner; the first sound reception unit generates and transmits the first pickup audio information to the basic communication module; after the basic communication module receives the first pickup audio information, the communication terminal may further process the first pickup audio information and the second pickup audio information, so as to acquire the returned audio information.

Figure 24:
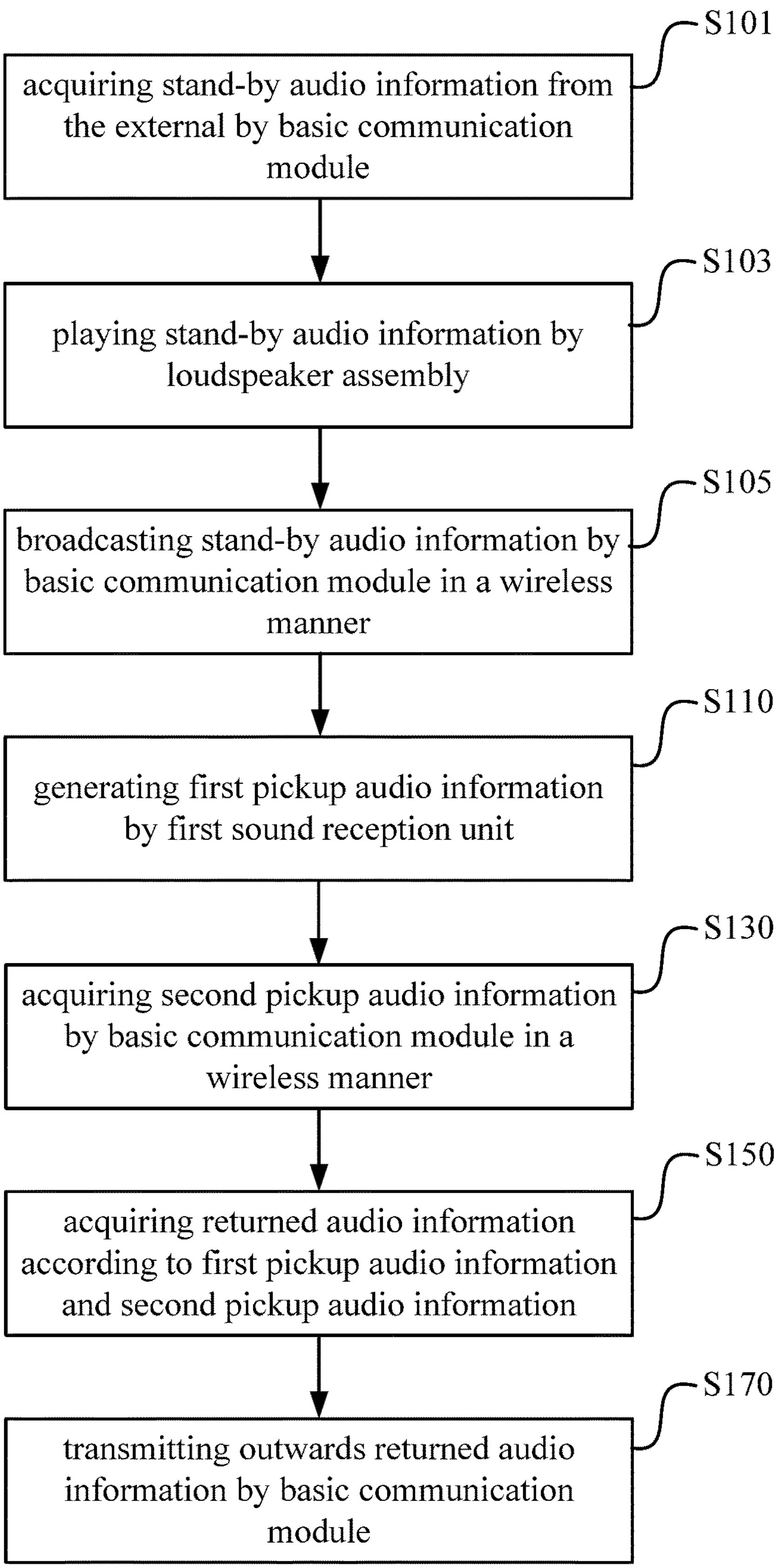
FIG. 24 a flow chart of another audio information processing method according to embodiments of the present disclosure.

FIG. 24 is a flow chart of an audio information processing method according to embodiments of the present disclosure.

With reference to FIG. 24, in some embodiments, before the steps S110-S170, the audio information processing method may further include steps S101-S105 as follows, wherein the steps S110-S170 are basically the same as the steps S110-S170 described above with reference to FIG. 23.

Step S101, acquiring stand-by audio information from the external by the basic communication module.

The basic communication module acquires the stand-by audio information from the external of the communication terminal in a wired or wireless manner. The stand-by audio information may be audio information generated and transmitted by device at the first place (for example, audio information that people at the first place wish to display), or may also be audio information generated by picking up sound of conference attenders at the second place.

Step S103, playing the stand-by audio information by loudspeaker assembly.

The communication terminal further includes a loudspeaker assembly; the basic communication module transmits the stand-by audio information to the loudspeaker assembly; and the loudspeaker assembly plays the stand-by audio information.

Step S105, broadcasting the stand-by audio information by the basic communication module in a wireless manner.

The basic communication module further broadcasts the received stand-by audio information in a wireless manner, such that all the devices in the network may receive the stand-by audio information, thereby transmitting the stand-by audio information to the other devices or the other parts on the communication terminal. For example, the basic communication module 1006 may broadcast and transmit the stand-by audio information to all the devices in a corresponding Bluetooth network in a Bluetooth broadcasting manner. The first sound reception unit and the second sound reception unit may receive the broadcast stand-by audio information.

If required, after the step S101, the method may further include step S107 as follows:

Step S107, transmitting the stand-by audio information to other communication terminals or the second sound reception unit by the basic communication module in a unicast or multicast manner.

In one embodiment, the basic communication module is paired with one or more other communication terminals or the second sound reception unit in a wireless manner; and the basic communication module transmits the stand-by audio information to the one or more other communication terminals or the second sound reception unit paired with the basic communication module. The other communication terminals may include a loudspeaker, such that the stand-by audio information received by the basic communication module may be played.

When the other communication terminals are used to pick up sound to generate second pickup audio information and step S130 includes step S130*a* (namely, acquiring the second pickup audio information by the basic communication module in a wireless manner from other communication terminals paired with the basic communication module), the other communication terminals may utilize the stand-by audio information to perform the echo cancellation process on the picked sound. When the other communication terminals are not used to play the stand-by audio information, the stand-by audio information may be used as a reference signal for the echo cancellation process, so as to improve the quality of the second pickup audio information generated by the other communication terminals.

The steps S105 and the step S107 may be executed in a selected form, and may be simultaneously executed.

In some embodiments, before the step S130*b*, the method may include the step S120 as described above; and the step S120 include steps S121-S123 as described above, wherein the step S123 includes step S123*b* as follows:

Step S123*b*, performing an echo cancellation process on the second audio signal according to the stand-by audio information to acquire the second pickup audio information.

After the step S105 and the step S121, the second sound reception unit follows the preset rule or the input of the user to perform an echo cancellation process on the second audio signal acquired in the step S121 according to the stand-by audio information received from the basic communication module, and acquires the corresponding second pickup audio information according to the echo cancellation processing result. When the second sound reception unit does not include the loudspeaker, the second sound reception unit does not have played audio information as a reference signal for the echo cancellation process. After the basic communication module transmits the stand-by audio information to the second sound reception unit, the second sound reception unit may take the received stand-by audio information as the reference signal for the echo cancellation process to perform an echo cancellation process on the picked sound, thereby improving the quality of the second pickup audio information generated by the second sound reception unit.

In some embodiments, the step S110 may include steps S111-S113 as follows:

Step S111, picking up sound to generate first audio signal by the first sound reception unit.

The first sound reception unit picks up sound, and converts the acoustic signal into corresponding electrical signal to generate a first audio signal.

Step S113, performing an echo cancellation process on the first audio signal according to the stand-by audio information to acquire the first pickup audio information.

The basic communication module transmits the received stand-by audio information to the first sound reception unit in a wired or wireless manner. The first sound reception unit follows the preset rule or the input of the user to perform an echo cancellation process on the first audio signal acquired in the step S111 according to the received stand-by audio information, and acquires the corresponding first pickup audio information according to the echo cancellation processing result. When the first sound reception unit does not include the loudspeaker, the first sound reception unit does not have played audio information as a reference signal for the echo cancellation process. After the basic communication module transmits the stand-by audio information to the first sound reception unit, the first sound reception unit may take the received stand-by audio information as the reference signal for the echo cancellation process to perform an echo cancellation process on the picked sound, thereby improving the quality of the first pickup audio information generated by the first sound reception unit.

A person skilled in the art should understand that the audio information processing method does not have to strictly follow the above steps; the sequence of the above steps may be adjusted, a new step may be added or some of the steps may be deleted according to practical requirements, for example, the step S110 and the step S130 may be executed sequentially, or may also be executed at the same time.

A person skilled in the art may understand that all or some of the steps of the method for implementing the above embodiments may be completed by instructing relevant hardware via a program; the program is stored in a storage medium, and includes a plurality of instructions for instructing the corresponding device or processor in the communication terminal to execute all or some of the steps of the method provided in the embodiments of the present application. The foregoing storage media include: USB flash drive, removable hard disk, read-only memory (ROM), a random access memory (RAM), magnetic disk, optical disk, or other media that may store program code.

In the communication terminal, communication system and audio information processing method provided by the embodiments of the present disclosure, the communication terminal acquires the pickup audio information from a plurality of different sources, receives the returned audio information generated according to the pickup audio information from the plurality of sources, and transmits the returned audio information to the external device, thereby achieving the effect that when multiple people used, a plurality of sound reception devices or sound reception components may synchronously receive sound.

The descriptions above are only preferred embodiments of the present disclosure, but are not intended to limit the present disclosure. For a person skilled in the art, the present disclosure may have various changes and variations. Any modifications, equivalent substitutions, improvements and the like made within the spirit and principles of the present disclosure are all intended to be concluded in the protection scope of the present disclosure.

We claim:

1. A communication terminal, comprising:

a sound reception assembly, comprising a first sound reception unit configured to pick up sound to generate first pickup audio information;

a basic communication module, configured to receive second pickup audio information in a wireless manner and transmit outwards returned audio information, the returned audio information being acquired according to the first pickup audio information and the second pickup audio information, the basic communication module is further configured to receive a stand-by audio information; and a loudspeaker assembly for playing the stand-by audio information;

wherein the basic communication module is further configured to transmit the stand-by audio information to the first sound reception unit;

the first sound reception unit comprises:

a first acousto-electric conversion device, configured to pick up sound to generate a first audio signal; and a first audio processing module, configured to generate the first pickup audio information according to the first audio signal;

the first audio processing module is further configured to perform an echo cancellation process on the first audio signal according to the stand-by audio information to generate the first pickup audio information.

2. The communication terminal according to claim 1, wherein the basic communication module is further configured to transmit the second pickup audio information to the first audio processing module; the first audio processing module is further configured to perform an audio mixing process on the first pickup audio information and the second pickup audio information to acquire the returned audio information.

3. The communication terminal according to claim 1, wherein the first sound reception unit further comprises:

a first wireless communication module, electrically connected to the first audio processing module, and configured to transmit the first pickup audio information to the basic communication module.

4. The communication terminal according to claim 3, wherein the communication terminal further comprises:

a third audio processing module, electrically connected to the basic communication module, and configured to perform an audio mixing process on the first pickup audio information and the second pickup audio information to acquire the returned audio information.

5. The communication terminal according to claim 1, wherein the sound reception assembly further comprises at least one second sound reception unit; the second sound reception unit comprises:

a second acousto-electric conversion device, configured to pick up sound to generate a second audio signal;

a second audio processing module, configured to generate the second pickup audio information according to the second audio signal; and a second wireless communication module, configured to transmit the second pickup audio information to the basic communication module.

6. The communication terminal according to claim 5, wherein the basic communication module is further configured to receive stand-by audio information;

the communication terminal further comprises a loudspeaker assembly for playing the stand-by audio information;

the basic communication module is further configured to transmit the stand-by audio information to the second sound reception unit; the second audio processing module is further configured to perform an echo cancellation process on the second audio signal according to the stand-by audio information to generate the second pickup audio information.

7. The communication terminal according to claim 1, wherein the basic communication module is further configured to broadcast the stand-by audio information in a wireless manner; and the first sound reception unit is further configured to receive the broadcast stand-by audio information in a wireless manner.

8. The communication terminal according to claim 1, wherein the basic communication module is further configured to transmit the returned audio information to another communication terminal paired with the basic communication module.

9. A communication system, comprising:

a primary communication terminal, comprising a primary basic communication module and a primary sound reception assembly, the primary sound reception assembly being configured to pick up sound to generate primary pickup audio information; and at least one secondary communication terminal, comprising a secondary basic communication module and a secondary sound reception assembly, the secondary sound reception assembly being configured to pick up sound to generate secondary pickup audio information, the secondary basic communication module being configured to transmit secondary returned audio information to the primary basic communication module in a wireless manner, and the secondary returned audio information being acquired according to the secondary pickup audio information, wherein the primary basic communication module is configured to transmit outwards primary returned audio information, the primary returned audio information being acquired according to the primary pickup audio information and the secondary pickup audio information;

wherein the primary basic communication module is further configured to receive stand-by audio information; the primary sound reception assembly comprises a primary acousto-electric conversion device and a primary audio processing module; the primary acousto-electric conversion device is configured to pick up sound to generate a primary audio signal; the primary audio processing module is configured to perform an echo cancellation process on the primary audio signal according to the stand-by audio information, so as to generate the primary pickup audio information;

the secondary sound reception assembly comprises a secondary acousto-electric conversion device and a secondary audio processing module; the secondary acousto-electric conversion device is configured to pick up sound to generate a secondary audio signal; the secondary audio processing module is configured to perform an echo cancellation process on the secondary audio signal according to the stand-by audio information, so as to generate the secondary pickup audio information.

10. An audio information processing method, applied to a communication terminal, the method comprising:

generating first pickup audio information by a first sound reception unit;

acquiring second pickup audio information by a basic communication module in a wireless manner;

acquiring returned audio information according to the first pickup audio information and the second pickup audio information; and transmitting outwards the returned audio information by the basic communication module;

wherein the method further comprises:

acquiring stand-by audio information from an external by the basic communication module;

playing the stand-by audio information by a loudspeaker assembly;

broadcasting the stand-by audio information by the basic communication module in a wireless manner;

picking up sound to generate a second audio signal by a second sound reception unit; and performing an echo cancellation process on the second audio signal according to the stand-by audio information to acquire the second pickup audio information.

11. The audio information processing method according to claim 10, wherein the acquiring returned audio information according to the first pickup audio information and the second pickup audio information comprises:

performing an audio mixing process on the first pickup audio information and the second pickup audio information to acquire the returned audio information.

12. The audio information processing method according to claim 11, wherein the performing an audio mixing process on the first pickup audio information and the second pickup audio information to acquire the returned audio information comprises:

performing, by the first sound reception unit, an audio mixing process on the first pickup audio information and the second pickup audio information to acquire the returned audio information; or performing, by a third audio processing module, an audio mixing process on the first pickup audio information and the second pickup audio information to acquire the returned audio information, wherein the third audio processing module is electrically connected to the basic communication module.

13. The audio information processing method according to claim 10, wherein the generating first pickup audio information by a first sound reception unit comprises:

picking up sound to generate a first audio signal by the first sound reception unit; and performing an echo cancellation process on the first audio signal according to the stand-by audio information to acquire the first pickup audio information.

* * * * *